United States Patent
Park et al.

(10) Patent No.: US 10,193,667 B2
(45) Date of Patent: Jan. 29, 2019

(54) METHOD FOR PERFORMING COMP OPERATION IN WIRELESS COMMUNICATION SYSTEM AND AN APPARATUS FOR SUPPORTING THE SAME

(71) Applicant: LG ELECTRONICS INC., Seoul (KR)

(72) Inventors: Kyungmin Park, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 111 days.

(21) Appl. No.: 15/309,751

(22) PCT Filed: Dec. 29, 2014

(86) PCT No.: PCT/KR2014/012953
§ 371 (c)(1),
(2) Date: Nov. 8, 2016

(87) PCT Pub. No.: WO2015/170812
PCT Pub. Date: Nov. 12, 2015

(65) Prior Publication Data
US 2017/0272219 A1 Sep. 21, 2017

Related U.S. Application Data

(60) Provisional application No. 61/991,425, filed on May 9, 2014.

(51) Int. Cl.
*H04W 4/00* (2018.01)
*H04L 5/00* (2006.01)
(Continued)

(52) U.S. Cl.
CPC ........... *H04L 5/0035* (2013.01); *H04B 7/024* (2013.01); *H04W 48/08* (2013.01);
(Continued)

(58) Field of Classification Search
CPC .. H04L 5/0035; H04W 72/0486; H04W 48/08
See application file for complete search history.

(56) References Cited

U.S. PATENT DOCUMENTS 9,888,469 B2 * 2/2018 Prasad .............. H04W 72/0433
9,894,668 B2 * 2/2018 Park .................... H04W 72/085
(Continued)

FOREIGN PATENT DOCUMENTS

JP 2013-504906 A 2/2013

OTHER PUBLICATIONS

Qualcomm Inc., "Parameters for backhaul signaling", R1-140456, 3GPP TSG-RAN WG1 #76, Feb. 10-14, 2014, Prague, Czech Republic.
(Continued)

*Primary Examiner* — Clemence S Han
(74) *Attorney, Agent, or Firm* — Dentons US LLP

(57) ABSTRACT

Disclosed herein are a method of performing a Coordinated Multi-Point (CoMP) operation in a wireless communication system and an apparatus for supporting the same. A method of performing an inter-eNB CoMP operation in a wireless communication system includes receiving, by a first eNB, a first LOAD INFORMATION message that requests the start of the CoMP operation from a second eNB, sending, by the first eNB, a second LOAD INFORMATION message for requesting Benefit Metric Information Element (IE) to the second eNB, receiving, by the first eNB, a third LOAD INFORMATION message, including the Benefit Metric IE from the second eNB, coordinating, by the first eNB, the resources of the eNBs included in the CoMP cluster, and sending, by the first eNB, a second LOAD INFORMATION message including results of the resource coordination to the eNBs included in the CoMP cluster.

11 Claims, 8 Drawing Sheets

(51) Int. Cl.
  *H04B 7/024* (2017.01)
  *H04W 48/08* (2009.01)
  *H04W 72/04* (2009.01)
  *H04B 7/06* (2006.01)

(52) U.S. Cl.
  CPC ......... *H04W 72/0486* (2013.01); *H04B 7/063* (2013.01); *H04B 7/0639* (2013.01)

(56) References Cited

U.S. PATENT DOCUMENTS

| | | |
|---|---|---|
| 2010/0014426 A1 | 1/2010 | Cavalli et al. |
| 2013/0115999 A1 | 5/2013 | Sirotkin et al. |
| 2014/0153436 A1* | 6/2014 | Matsuo ................ H04B 7/024 370/253 |
| 2015/0063222 A1* | 3/2015 | Wang .................... H04W 24/02 370/329 |
| 2015/0312893 A1* | 10/2015 | Prasad .................. H04B 7/024 370/328 |
| 2015/0312903 A1* | 10/2015 | Prasad .................. H04B 7/024 370/329 |
| 2015/0349908 A1* | 12/2015 | Centonza .......... H04W 72/1252 370/329 |
| 2017/0093537 A1* | 3/2017 | Wang .................... H04L 5/0035 |
| 2017/0180016 A1* | 6/2017 | Park ...................... H04B 7/024 |

OTHER PUBLICATIONS

Samsung, "Introduction of TDD eIMTA in Load Information", R3-140147, 3GPP TSG-RAN WG3 Meeting #82, San Francisco, CA, USA, Nov. 11-15, 2013.

* cited by examiner

[FIG. 1]
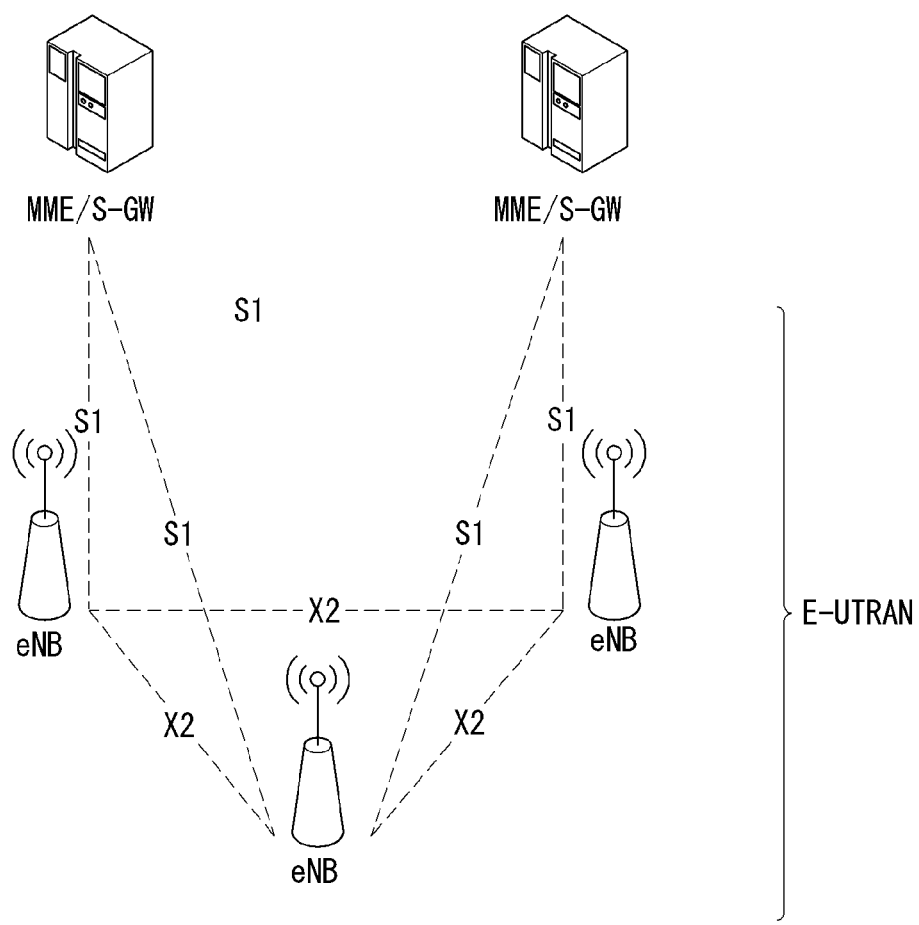

[FIG. 2]
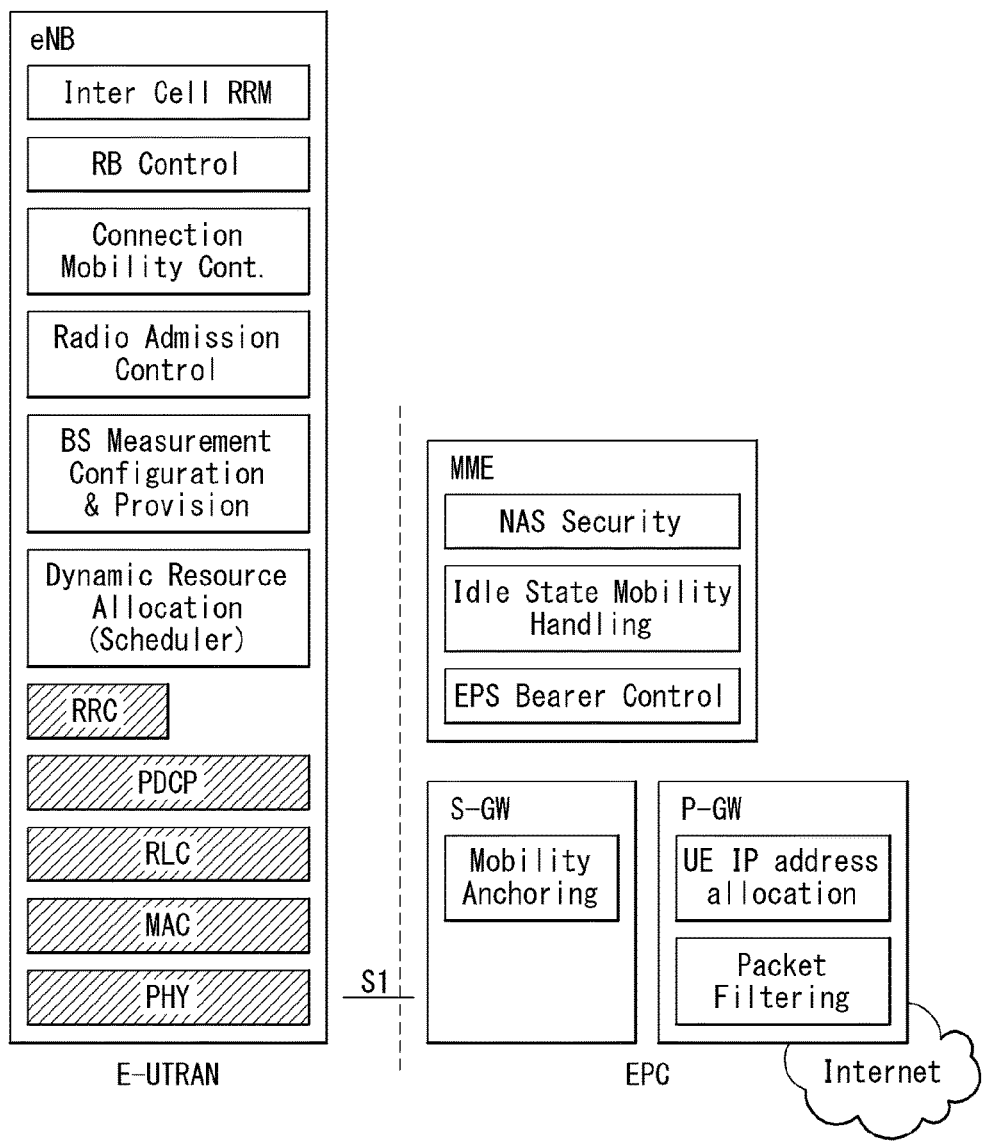

【FIG. 3】
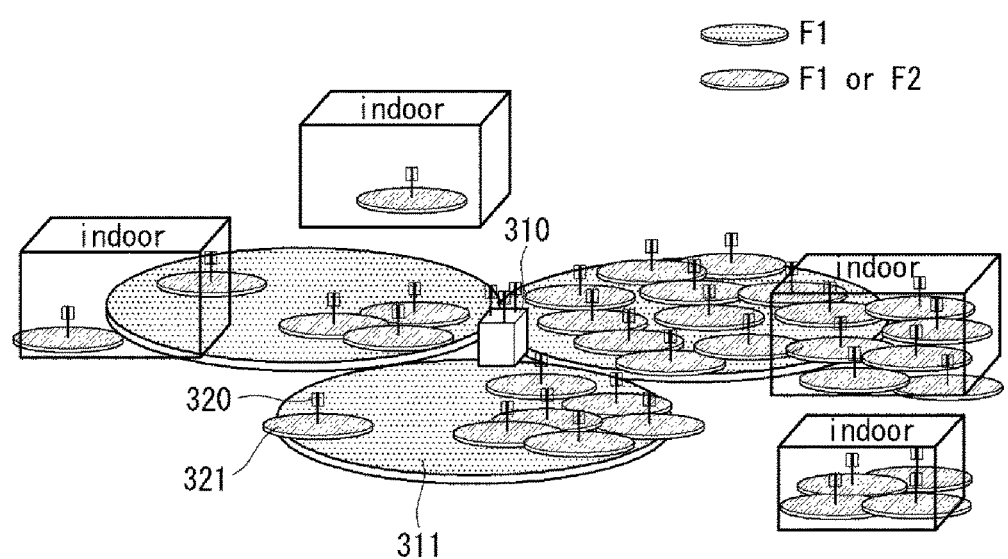

[FIG. 4]
(a)
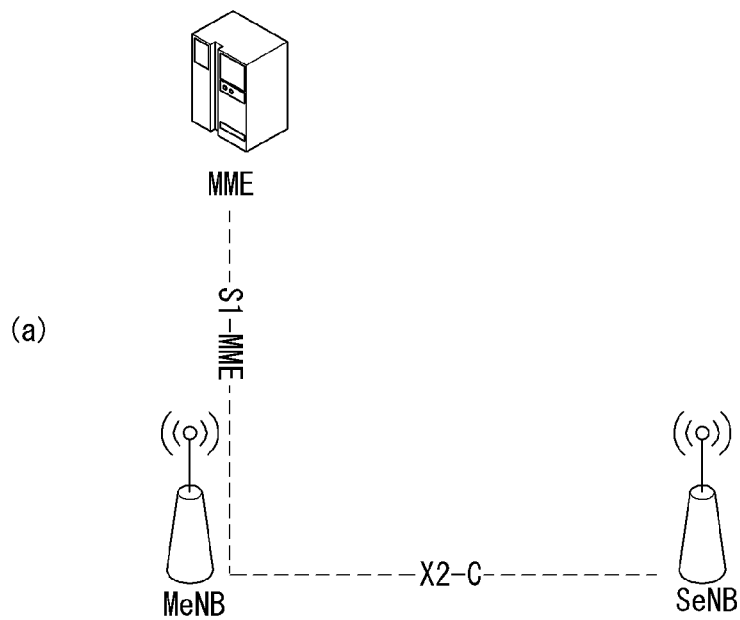
(b)
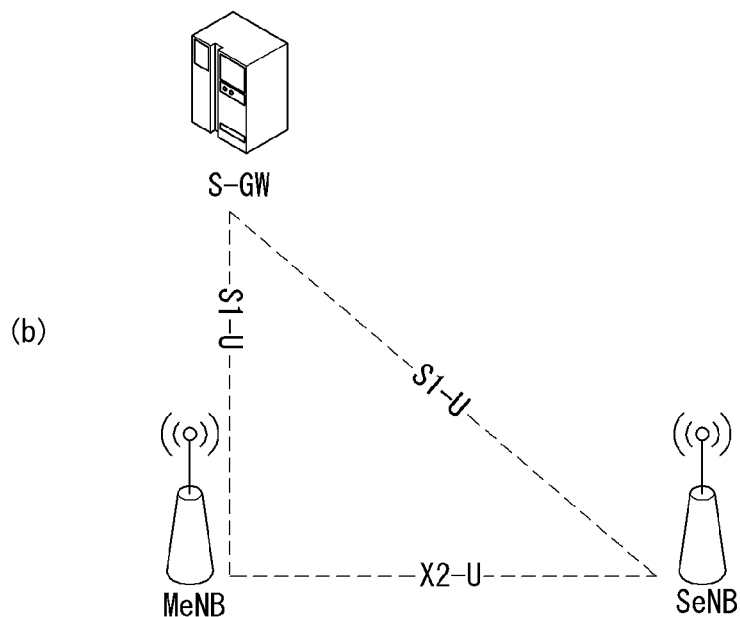

[FIG. 5]
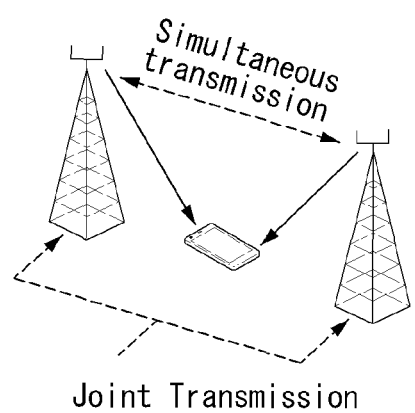
Joint Transmission
(a)
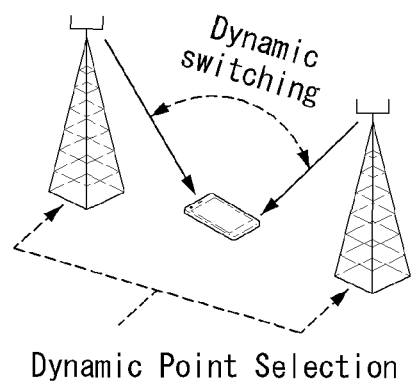
Dynamic Point Selection
(b)
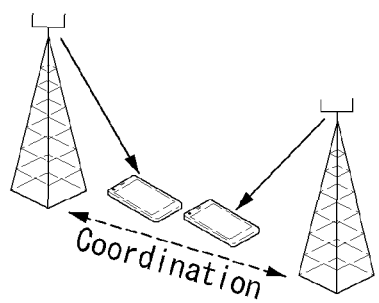
Coordinated Scheduling
(c)
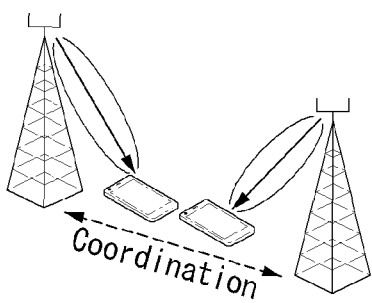
Coordinated Beamforming
(d)

[FIG. 6]
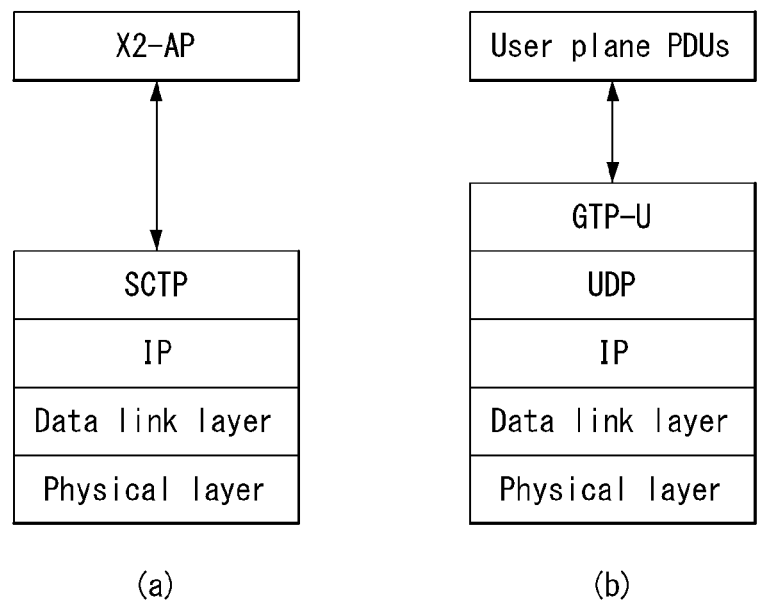
(a)  (b)
[FIG. 7]
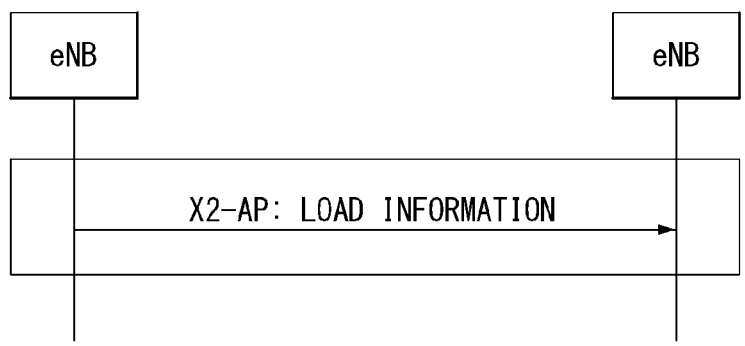

[FIG. 8]
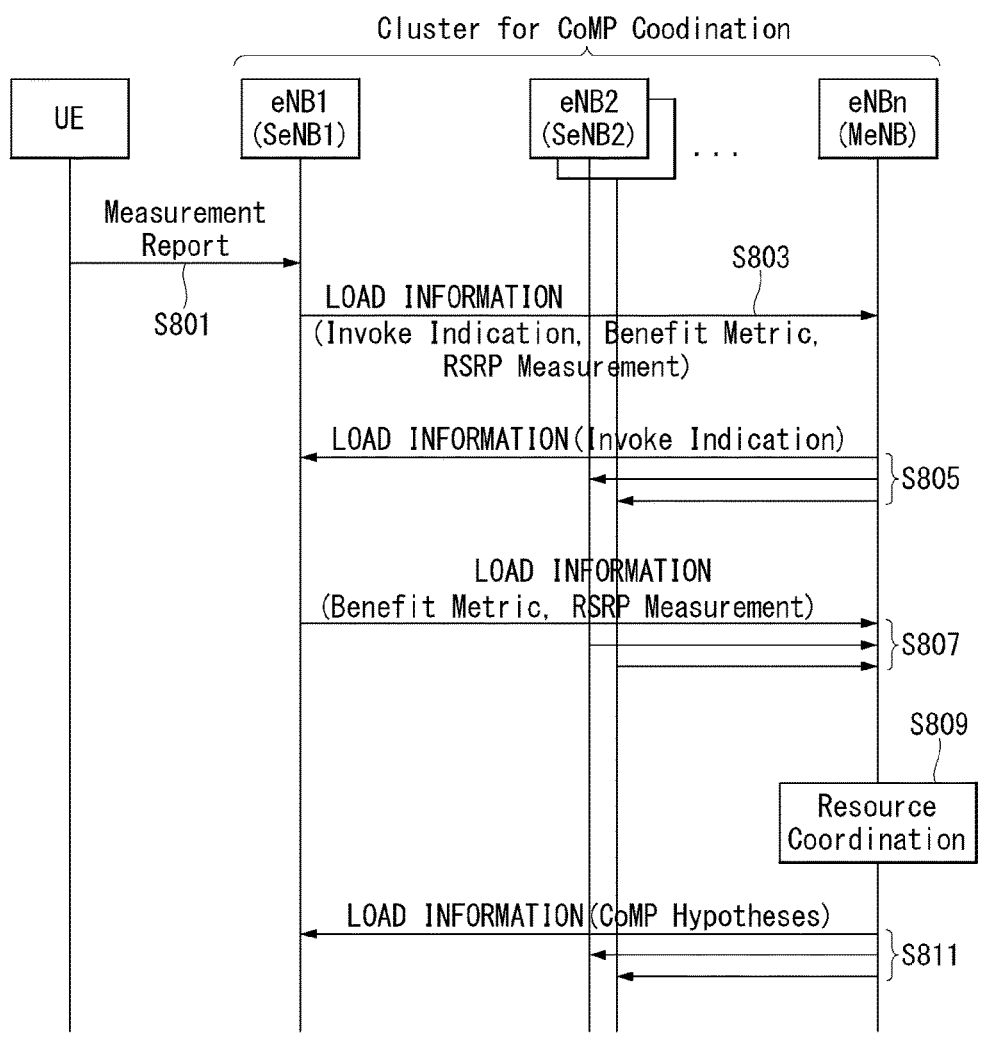

[FIG. 9]
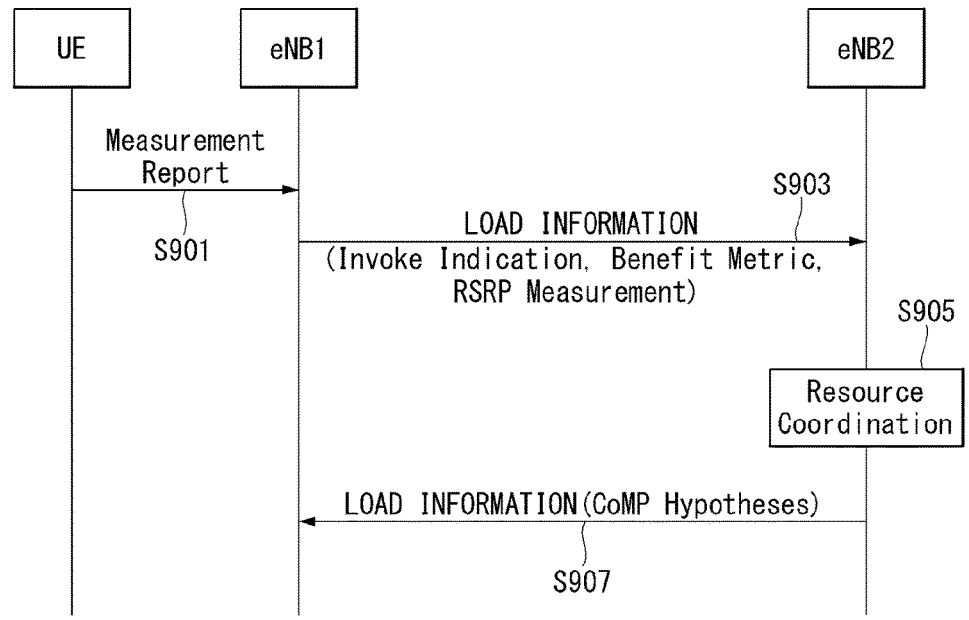
[FIG. 10]
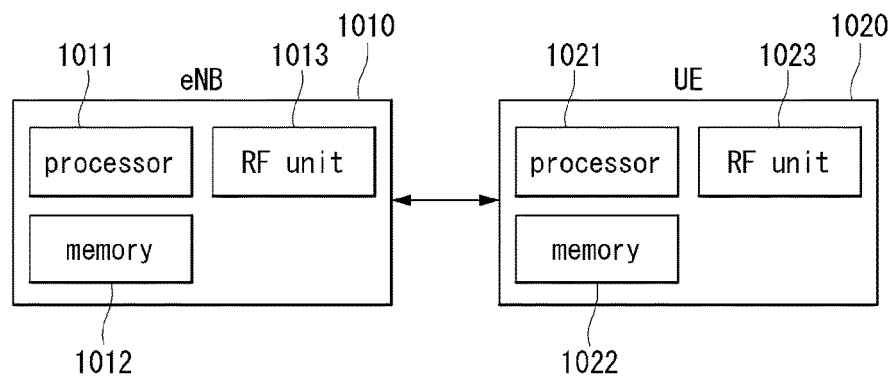

METHOD FOR PERFORMING COMP OPERATION IN WIRELESS COMMUNICATION SYSTEM AND AN APPARATUS FOR SUPPORTING THE SAME

CROSS-REFERENCE TO RELATED APPLICATIONS

This application is a National Stage Application of International Application No. PCT/KR2014/012953, filed on Dec. 29, 2014, which claims the benefit of U.S. Provisional Application No. 61/991,425, filed on May 9, 2014, all of which are hereby incorporated by reference in their entirety for all purposes as if fully set forth herein.

TECHNICAL FIELD

The present invention relates to a wireless communication system and, more particularly, to a method for performing a Coordinated Multi-Point (CoMP) operation in a wireless communication system and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose an improved network operation in order to more smoothly perform a CoMP operation between cells in a wireless communication system.

Another object of the present invention is to propose a signaling procedure between eNBs and parameters exchanged between eNBs for performing a CoMP operation in a wireless communication system.

The technical problems solved by the present invention are not limited to the above technical problems and those skilled in the art may understand other technical problems from the following description.

Technical Solution

An aspect of the present invention provides a method of performing an inter-eNB Coordinated Multi-Point (CoMP) operation in a wireless communication system. The method may include receiving, by a first eNB, a first LOAD INFORMATION message that requests the start of the CoMP operation from a second eNB, sending, by the first eNB, a second LOAD INFORMATION message for requesting Benefit Metric IE to the second eNB, receiving, by the first eNB, a third LOAD INFORMATION message, including the Benefit Metric IE from the second eNB, coordinating, by the first eNB, the resources of the eNBs included in the CoMP cluster, and sending, by the first eNB, a second LOAD INFORMATION message including results of the resource coordination to the eNBs included in the CoMP cluster.

Another aspect of the present invention provides an first eNB for performing an inter-eNB CoMP operation in a wireless communication system. The first eNB may include a Radio Frequency (RF) unit configured to send and receive radio signals and a processor, wherein the processor may be configured to receive a first LOAD INFORMATION message that requests the start of the CoMP operation from a second eNB, send a second LOAD INFORMATION message for requesting Benefit Metric IE to the second eNB, receive a third LOAD INFORMATION message, including the Benefit Metric IE from the second eNB, coordinate the resources of the eNBs included in the CoMP cluster, and send a second LOAD INFORMATION message including results of the resource coordination to the eNBs included in the CoMP cluster.

Preferably, the first LOAD INFORMATION message may include an Invoke Indication IE, and the Invoke Indication IE may include CoMP Initiation for requesting the start of the CoMP operation.

Preferably, the first LOAD INFORMATION message may further include the Benefit Metric IE.

Preferably, the second LOAD INFORMATION message may include an Invoke Indication IE, and the Invoke Indication IE may include CoMP Information IE for requesting the Benefit Metric.

Preferably, the second LOAD INFORMATION message may further include information about a transmission period of the Benefit Metric.

Preferably, the second LOAD INFORMATION message may further include information about whether the results of the resource coordination are periodically or aperiodically transmitted. If the results of the resource coordination are periodically transmitted, the second LOAD INFORMATION message may further include the transmission period of the results of the resource coordination. If the results of the resource coordination are aperiodically transmitted, the second LOAD INFORMATION message may further include information about the valid time of the results of the resource coordination.

Preferably, the third LOAD INFORMATION message may include a CoMP Information IE, and the CoMP Information IE may include the Benefit Metric.

Preferably, the fourth LOAD INFORMATION message may include a CoMP Information IE, and the CoMP Information IE may include CoMP Hypotheses IE indicative of the results of the resource coordination.

Preferably, the fourth LOAD INFORMATION message may further include information about a transmission period of Benefit Metric.

Preferably, the fourth LOAD INFORMATION message may further include information about whether the results of the resource coordination are periodically or aperiodically transmitted. If the results of the resource coordination are periodically transmitted, the fourth LOAD INFORMATION message may further include the transmission period of the results of the resource coordination. If the results of the resource coordination are aperiodically transmitted, the fourth LOAD INFORMATION message may further include information about the valid time of the results of the resource coordination.

Preferably, a fifth LOAD INFORMATION message for ordering the stop of the CoMP operation may be transmitted to an eNB included in the CoMP cluster.

Advantageous Effects

In accordance with an embodiment of the present invention, a CoMP operation between cells in a wireless communication system may be performed more smoothly.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a schematic structure a network structure of an evolved universal mobile telecommunication system (E-UMTS) to which the present invention can be applied;

FIG. 2 illustrates architecture of a typical E-UTRAN and a typical EPC to which the present invention can be applied;

FIG. 3 is a view schematically illustrating a small cell deployment scenario in the wireless communication system to which the present invention can be applied;

FIG. 4 illustrates network interfaces for Dual Connectivity in the wireless communication system to which the present invention can be applied;

FIG. 5 illustrates CoMP category in the wireless communication system to which the present invention can be applied;

FIG. 6 illustrates the configurations of a control plane and a user plane protocol of an X2 interface in the wireless communication system to which the present invention can be applied;

FIG. 7 illustrates Load Indication procedure through the X2AP protocol in the wireless communication system to which the present invention can be applied;

FIG. 8 illustrates a centralized signaling procedure for an inter-eNB CoMP in accordance with an embodiment of the present invention;

FIG. 9 illustrates a distributed signaling procedure for an inter-eNB CoMP in accordance with an embodiment of the present invention; and FIG. 10 is a block diagram of a wireless communication apparatus according to an embodiment of the present invention.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighboring eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates architecture of a typical E-UTRAN and a typical EPC to which the present invention can be applied.

Referring to the FIG. 2, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as stated above, the gateway may perform functions of paging origination, LTE_IDLE state management, ciphering of the user plane, System Architecture Evolution (SAE) bearer control, and ciphering and integrity protection of NAS signaling.

Small Cell Enhancement

In order to accommodate explosively increasing data traffic, research into a small cell enhancement technique to cover a relatively small area using small amount of power, relative to an existing macro cell, has been actively conducted.

Small cell enhancement refers to a technique of densely disposing small cells within macro cell coverage (or without macro cell coverage in case of the interior of a building, or the like) and maximizing spectrum efficiency per unit area through close cooperation between a macro cell eNB and a small cell eNB or between small cell eNBs to enable effective mobility management, while accommodating explosively increasing traffic. In particular, there is huge communication demand in a particular area such as a so-called hot spot within a cell, and receive sensitivity of propagation may be degraded in a particular area such as a cell edge or a coverage hole, and thus, a small cell may be used in a communication shadow area not covered by only a macro cell or an area, such as a hot spot, in which a large amount of data services is requested.

A macro cell eNB may also be called macro eNB (MeNB), and a small cell eNB may also be called a small eNB, a secondary eNB (SeNB), a pico eNB, a femto eNB, a micro eNB, a Remote Radio Head (RRH), a relay, a repeater, or the like. In this manner, a network in which macro cells and small cells coexist is called a heterogeneous network (HetNet).

FIG. 3 is a view schematically illustrating a small cell deployment scenario in the wireless communication system to which the present invention can be applied.

Referring to FIG. 3, an MeNB 310 provides a wireless communication environment to a UE within coverage of a macro cell area 311, and an SeNB 320 provides a wireless communication environment to a UE within coverage of a small cell area 321.

As illustrated in FIG. 3, coverage of the macro cell area 311 and coverage of the small cell region 321 may overlap or may not, and a carrier frequency F1 supported by the MeNB 310 and a carrier frequency supported by the SeNB 320 may be identical (when the SeNB supports F1) or may not (when the SeNB supports F2). Both ideal backhaul and non-ideal backhaul may be supported between the MeNB and the SeNB or between a plurality of SeNBs. Also, both a dense or sparse small cell deployment may be considered and both indoor and outdoor small cell deployment may be considered. In FIG. 3, the macro cell area 311 and the small cell area 321 are merely illustrative, and different numbers or sizes of the macro cell areas and the small cell areas may be deployed.

Small cell enhancement considers all of various scenarios as described above with respect to the small cell deployment. This will be described in detail hereinafter.

With and without Macro Coverage

Small cell enhancement considers both with and without macro coverage. More specifically, Small cell enhancement is considered the deployment scenario in which small cell nodes are deployed under the coverage of one or more than one overlaid E-UTRAN macro-cell layer(s) in order to boost the capacity of already deployed cellular network. Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Ideal and Non-Ideal Backhaul

Small cell enhancement considers both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Dual Connectivity

In the heterogeneous networks which supports small cell enhancement, there are various requirements related to mobility robustness, increased signaling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface. The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for certain UE may be assumed to have two different roles. That is, an eNB may either act as an MeNB or as an SeNB. In dual connectivity a UE can be connected to one MeNB and one SeNB. MeNB is the eNB which terminates at least S1-MME in dual connectivity, and SeNB is the eNB that provides additional radio resources to the UE, but is not a Master eNB in dual connectivity.

In addition, DC with CA configured means mode of operation of a UE in RRC_CONNECTED, configured with a Master Cell Group and a Secondary Cell Group. In this case, "cell group" is a group of serving cells associated with either the Master eNB (MeNB) or the Secondary eNB (SeNB) in dual connectivity. "Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

In this case, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 4 illustrates network interfaces for Dual Connectivity in the wireless communication system to which the present invention can be applied.

FIG. 4(a) illustrates Control Plane architecture for Dual Connectivity, and FIG. 4(b) illustrates User Plane architecture for Dual Connectivity.

Inter-eNB control plane signaling for dual connectivity can be performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB can be performed by means of X2 interface signaling.

Referring to the FIG. 4(a), the MeNB is C-plane connected to the MME via S1-MME, the MeNB and the SeNB are interconnected via X2-C.

FIG. 4(b) shows U-plane connectivity of eNBs involved in dual connectivity for a certain UE. U-plane connectivity depends on the bearer option configured as follow.

For MCG bearers, the MeNB is a U-plane connected to the S-GW via S1-U, the SeNB is not involved in the transport of user plane data. For split bearers, the MeNB is a U-plane connected to the S-GW via S1-U and in addition, the MeNB and the SeNB are interconnected via X2-U. In this case, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

Coordinated Multi-Point (CoMP)

A Coordinated Multi-Point (CoMP) system (hereinafter referred to as a "CoMP system") is a system for improving the throughput of users in a cell boundary by applying improved Multiple-Input and Multiple-Output (MIMO) transmission in a multi-cell environment. A CoMP is also called co-MIMO, collaborative MIMO, or network MIMO. If a CoMP system is applied, inter-cell interference in a multi-cell environment can be reduced. If such a CoMP system is used, UE can be commonly supported data from multi-cell eNBs. Furthermore, system performance can be improved because eNBs support one or more UEs at the same time using the same radio frequency resources.

UE that is supported the CoMP may communicate with cells placed at different points. If such cells are bound into a single group, they may operate as a virtual MIMO system. Cells that directly and/or indirectly participate in transmitting sending data to UE are denoted as a CoMP cooperating set. Furthermore, a cell(s) that actually sends data to UE is called a CoMP transmission cell(s) (or Transmission Point (TP).

Such a CoMP technology may be applied to a heterogeneous network (HetNet) in which macro cells and small cells are mixed in addition to a homogeneous network.

Channel State Information for CoMP

In a 3GPP LTE/LTE-A system, each UE reports Channel State Information (CSI) according to a downlink channel condition to an eNB through uplink. The UE measures the state of a channel based on a Cell-specific Reference Signal (CRS) or a Channel State Information-Reference Signal (CSI-RS) received from the eNB. A scheme for reporting channel information is divided into periodic reporting in which channel information is periodically transmitted and aperiodic reporting in which channel information is transmitted in response to a request from an eNB. An eNB determines proper time/frequency resources, a proper Modulation and Coding Scheme (MCS) or beam pattern (or antenna pattern, far-field pattern, radiation pattern) in order to send data for each UE using CSI received from the UE.

Such CSI may basically include a Channel Quality Indicator (CQI), a Precoding Matrix Indicator (PMI), and a Rank Indicator (RI), etc. All pieces of CSI may be transmitted or some of the pieces of CSI may be transmitted depending on transmission mode of each UE.

A CQI is a value indicative of the intensity of a channel, and it commonly means a reception Signal to Interference plus Noise Ratio (SINR) that may be obtained when an eNB uses a PMI. UE reports a CQI index indicative of a specific combination in a set, including combinations of a predetermined modulation scheme and a code rate, to an eNB.

A RI is indicative of information about the rank of a channel, and it means the number of signal streams (or layers) that are received by UE through the same frequency-time resources. The value of a RI commonly has a longer cycle than a PMI, a CQI value because it is dominantly determined due to the long-term fading of a channel. Accordingly, the value of the RI is fed back from UE to an eNB.

A PMI is a value into which the spatial characteristics of a channel have been incorporated, and it indicates the precoding index of an eNB that is preferred by UE based on a metric, such as a Signal to Interference plus Noise Ratio (SINR). That is, a PMI is information about a precoding matrix used for transmission from an eNB. A precoding matrix fed back by UE is determined by taking into consideration the number of layers indicated by an RI. An eNB to which a PMI from UE is fed back may use a precoding matrix, recommended by the UE, without a change. This may be included in data transmission scheduling assignment information about the UE as an indicator of 1 bit. Furthermore, the eNB may not use the precoding matrix indicative of the PMI fed back by the UE without change. In such a case, the eNB may explicitly include information about a precoding matrix, used in data transmission to the UE, in scheduling assignment information.

Cells that belong to a CoMP cooperating set share the Channel State Information (CSI) of UE and determine TP.

For DL CoMP, the UE may be configured to measure and report the CSI of a set of non-zero power CSI-RS resources.

The UE may also be configured with one or more interference measurements. Each interference measurement is associated with one CSI-interference measurement (CSI-IM) resource, which is a set of REs on which the UE measures interference.

The UE may also be configured with multiple CSI processes. Each CSI process defines the CSI measurement associated with one non-zero power CSI-RS resource and one CSI-IM resource.

For UL CoMP, the UE may be configured with UE-specific parameters of PUSCH DMRS sequence and cyclic shift hopping, Physical Uplink Control Channel (PUCCH) sequence, and PUCCH region for hybrid-ARQ feedback. These UE-specific parameters can be configured independently of the physical cell identity of the UE's serving cell.

Intra-eNB/Inter-eNB CoMP

In a multi-cell environment, the CoMP may support both an intra-eNB CoMP and an inter-eNB CoMP. In relation to a cooperation node, the two schemes: the intra-eNB CoMP and the inter-eNB CoMP are present depending on whether or not all cells belonging to a CoMP cooperating set are controlled by the same eNB.

An intra-eNB CoMP operation is supported between cells that share the same eNB as a cell to which UE belongs. A single eNB may manage one or more sites. Furthermore, a site may include one or more cells (or sectors). That is, in the intra-eNB CoMP (including an inter-cell CoMP and an intra-cell CoMP), cooperation is performed only within the cells (or sectors) of the same eNB within a single site. The intra-eNB CoMP includes the CoMP between cells from the same eNB and the CoMP between RRHs distributed by the same cell or the same eNB. Cooperation does not require high speed, low latency, and site-to-site backbone connection, and the size of a CoMP cooperating set does not need to be the same as the number of sectors. As described above, pieces of information (e.g., data and CSI) are exchanged between cells based on the same eNB through ideal backhaul.

For the intra-eNB CoMP with ideal backhaul, two deployment cases may be considered as follows:

A Case A: Macro/High Power RRH+Macro/High Power RRH CoMP Scenario
  A scenario 1: a homogeneous network with an intra-site CoMP
  A scenario 2: a homogeneous network with high Tx power RRHs The intra-eNB CoMP scenario 1 means a CoMP operation between macro cells in the same site within a single macro eNB. That is, the intra-eNB CoMP scenario 1 means a CoMP operation between neighboring cells within a single site. Furthermore, the intra-eNB CoMP scenario 2 means a CoMP operation between macro cells that belong to different sites within a single macro eNB. That is, the intra-eNB CoMP scenario 2 means a CoMP operation between neighboring cells of cells that belong to different sites.

A Case B: Macro+Low Power RRH CoMP Scenario
  A scenario 3: a heterogeneous network with low power RRHs within macro cell coverage where transmission/reception points created by RRHs have cell IDs different from the cell ID of a macro cell
  A scenario 4: a heterogeneous network with low power RRHs within macro cell coverage where transmission/reception points created by the RRHs have the same cell IDs as a macro cell The intra-eNB CoMP scenarios 3 and 4 refer to a CoMP operation between small cells within a corresponding macro cell. In this case, the small cell means a cell that belongs to an RRH connected to a macro eNB to which the macro cell belongs through ideal backhaul.

Furthermore, the inter-eNB CoMP operation is supported between cells belonging to eNBs different from a cell to which UE belongs. That is, in the inter-eNB CoMP, cooperation is performed only within the cells (or sectors) of difference sites. This results in an interference problem at a cell boundary. Cooperation requires high speed, low latency, and site-to-site backbone connection. The static or dynamic clustering of a CoMP cooperating set is possible. As described above, pieces of information may be exchanged between cells based on different eNBs through non-ideal backhaul, such as microwaves, a Digital Subscriber Line (DSL), a cable, or a Passive Optical Network (PON).

For the inter-eNB CoMP with non-ideal backhaul, two deployment cases may be considered as follows:
  A case A: a CoMP operation scenario between macro eNBs in a homogeneous network
  A case B: a CoMP operation scenario in the Small Cell Enhancement (SCE)
    A scenario 1: a CoMP operation between a macro eNB and a small cell eNB in a heterogeneous network
    A scenario 2a: a CoMP operation between small cell eNBs in a heterogeneous network The inter-eNB CoMP scenario 1 means a CoMP operation between a macro cell and a small cell within the corresponding macro cell. In this case, the small cell means a cell belonging to an SeNB that is connected to a macro eNB to which the macro cell belongs through non-ideal backhaul. Furthermore, the inter-eNB CoMP scenario 2a means a CoMP operation between small cells within a macro cell. In this case, the channel of the macro cell is different from the channels of the small cells, and the channels of the small cells may be the same.

A single cell MIMO user within a single cell may communicate with a single SeNB in a single cell (or sector). A multi-cell MIMO user placed at a cell boundary may communicate with a plurality of SeNBs in a multi-cell (or sector). Furthermore, the type of cooperated users may be divided into Single User MIMO (SU-MIMO) and Multi-User MIMO (MU-MIMO). The CoMP may provide service to a single user in SU-MIMO mode and may serve various cases of UE at the same time in MU-MIMO mode.

CoMP Category

In relation to a cooperation level, a CoMP scheme may be divided into a variety of types of schemes depending on the degree of coordination, a traffic load, etc. between cells. This is described later with reference to FIG. 5.

FIG. 5 illustrates a CoMP category in a wireless communication system to which the present invention may be applied.

A CoMP scheme that may be applied to downlink may be divided into a Joint Processing (JP) scheme and a Coordinated Scheduling/Beamforming (CS/CB) scheme.

In the JP scheme, data for UE may be used in one or more points (eNBs) of a CoMP cooperating set. The JP scheme may be divided into a Joint Transmission (JT) scheme and a Dynamic Point Selection (DPS) scheme.

The JT scheme means a scheme in which some or all of a plurality of points that belongs to a CoMP cooperating set sends the same data through the same time-frequency resources at the same time. That is, data transmitted by a single UE or a plurality of pieces of UE through the same time-frequency resources may be transmitted by a plurality of transmission points at the same time. Accordingly, the quality of a signal transmitted by a UE can be increased regardless of a coherent or non-coherent way and interference between UEs can be actively removed through such a cooperation transmission scheme.

The DPS or muting scheme means a scheme in which data may be used in multiple points at the same time, but data is transmitted by a single point within a CoMP cooperating set through a single time-frequency resource. Data transmitted to UE through a specific time-frequency resource is transmitted by a single point, but is muted in another point within a CoMP cooperating set.

A point at which data is transmitted to UE or the data is muted may be dynamically selected for each subframe, and a Resource Block (RB) pair within a single subframe may be changed. The DPS scheme includes Dynamic Cell Selection (DCS).

As in a case where a plurality of points is selected through data transmission through the same time-frequency resources, the DPS scheme, together with the JT scheme, may form a set.

In the Coordinated Scheduling/Beamforming (CS/CB) scheme, data for UE may be used only in a single point within a CoMP cooperating set, and data is transmitted only by the corresponding point through a single time-frequency resource. That is, the data is transmitted from only the single point to the UE, but user scheduling/beamforming may be determined through cooperation between a plurality of points within the CoMP cooperating set. A Transmission Point (TP) may be semi-statically selected. Semi-Static Point Selection (SSPS) means transmission from one point to specific UE at a time. In this case, a transmission point may only change in a semi-static manner.

The CS/CB scheme may be divided into a Coordinated Scheduling (CS) scheme and a Coordinated Beamforming (CB) scheme.

In the CS scheme, a plurality of points within a CoMP cooperating set cooperates with each other and allocates different frequency resources to different UEs. Furthermore, in the CB scheme, a plurality of points within a CoMP cooperating set cooperates with each other and allocates different beam patterns to different UEs. As described above, different UEs receive data from respective serving cells only.

A CoMP operation of a hybrid category in which the JP scheme and the CS/CB scheme are combined is possible. Data for UE may be available only in a subset of points in a CoMP cooperating set for time-frequency resources, but user scheduling/beamforming are determined through coordination between points corresponding to the CoMP cooperating set. For example, some points within the CoMP cooperating set may send data to target UE according to the JP scheme, whereas other points within the CoMP cooperating set may perform CS/CB.

In the case of uplink, CoMP reception means that signals transmitted through cooperation between a plurality of points that are geographically separated are received. A CoMP scheme that may be applied to uplink may be divided into a Joint Reception (JR) scheme and a Coordinated Scheduling/Beamforming (CS/CB) scheme.

The JR scheme means a scheme in which some or all of a plurality of points receive a signal transmitted through a PUSCH in a CoMP unit. In the CS/CB scheme, a single point receives a signal transmitted through a PUSCH, but user scheduling/beamforming may be determined through cooperation between a plurality of cells in a CoMP unit.

CoMP Sets

CoMP cooperating set is the set of (geographically separated) points directly and/or indirectly participating in data transmission to a UE in a time-frequency resource. This set may or may not be transparent to the UE. The CoMP cooperating set defines the coordination area.

Direct participation is point(s) actually transmitting data in the time-frequency resource, and Indirect participation is candidate point(s) for data transmission that do not transmit data but contribute in making decisions on the user scheduling/beamforming in the time-frequency resource.

CoMP transmission point(s) is point or set of points transmitting data to a UE.

CoMP transmission point(s) is (are) a subset of the CoMP cooperating set.

For JT, CoMP transmission points may include multiple points in the CoMP cooperating set at each subframe for a certain frequency resource.

For CS/CB, DPS, SSPS, a single point in the CoMP cooperating set is the CoMP transmission point at each subframe for a certain frequency resource.

For SSPS, this CoMP transmission point can change semi-statically within the CoMP cooperating set.

CoMP measurement set is the set of points about which channel state/statistical information related to their link to the UE is measured and/or reported.

Radio Resource Management (RRM) measurement set is the set of cells for which the RRM measurements are performed (already in Rel-8). Additional RRM measurement methods can be considered e.g. in order to separate different points belonging to the same logical cell entity or in order to select the CoMP measurement set.

Meanwhile, the management of the CoMP measurement set may be based on UL sounding reference signal (SRS)/demodulation reference signal (DMRS)/PUCCH transmission and/or DL RRM measurements (e.g., reference signal received power (RSRP)/reference signal received quality (RSRQ) information). Measurement based on CRS and/or CSI-RS may be considered.

The CoMP cooperating set and the transmission points would be determined in the higher layers based on the CSI measurement of points included in the CoMP measurement set. Depending on the level of coordination, the cooperating set could be determined at the RRC level or at the MAC scheduler level.

X2 Interface

FIG. 6 illustrates the configurations of a control plane and a user plane protocol of an X2 interface in the wireless communication system to which the present invention can be applied.

FIG. 6(a) shows the control plane protocol stack on the X2 interface, and FIG. 6(b) shows the user plane protocol stack on the X2 interface.

Referring to the FIG. 6(a), the X2 control plane interface (X2-CP) is defined between two neighbor eNBs. The transport network layer is built on SCTP (Stream Control Transmission Protocol) on top of IP (Internet Protocol). The application layer signaling protocol is referred to as X2-AP (X2 Application Protocol).

A single SCTP association per X2-C interface instance shall be used with one pair of stream identifiers for X2-C common procedures. Only a few pairs of stream identifiers should be used for X2-C dedicated procedures.

Source-eNB communication context identifiers that are assigned by the source-eNB for X2-C dedicated procedures, and target-eNB communication context identifiers that are assigned by the target-eNB for X2-C dedicated procedures, shall be used to distinguish UE specific X2-C signaling transport bearers. The communication context identifiers are conveyed in the respective X2AP messages.

RNs terminate X2-AP. In this case, there is one X2 interface relation between the RN and the DeNB.

The X2AP protocol supports the following functions:
Intra LTE-Access-System Mobility Support for UE in ECM-CONNECTED (Context transfer from source eNB to target eNB, Control of user plane tunnels between source eNB and target eNB, Handover cancellation)
Support of Dual Connectivity for UE in ECM-CONNECTED (Establishment, Modification and Release of a UE context at the SeNB, Control of user plane tunnels between MeNB and SeNB for a specific UE for split bearer and data forwarding, Provision of the transport network layer (TNL) information of the S1 user plane tunnels for SCG bearers)
Load Management
General X2 management and error handling functions (Error indication, Setting up the X2, Resetting the X2, Updating the X2 configuration data)
Mobility failure event notification and information exchange in support of handover settings negotiation
Energy Saving. This function allows decreasing energy consumption by enabling indication of cell activation/deactivation Referring to the FIG. 6(b), the X2 user plane interface (X2-U) is defined between eNBs. The LTE X2-U protocol tunnels end-user packets between eNBs. The tunneling function supports the identification of packets with the tunnels and packet loss management. The X2-U interface provides non guaranteed delivery of user plane packet data units (PDUs). The transport network layer is built on IP transport and GTP-U is used on top of UDP (user datagram protocol) or IP to carry the user plane PDUs. The X2-UP interface protocol stack is identical to the S1-UP protocol stack. Thus, protocol processing for the eNB at the time of data forwarding can be minimized.

FIG. 7 illustrates Load Indication procedure through the X2AP protocol in the wireless communication system to which the present invention can be applied.

Inter-cell interference coordination in E-UTRAN is performed through the X2 interface. In case of variation in the interference conditions, the eNB signals the new condition to its neighboring eNBs using LOAD INFORMATION message e.g. the neighboring eNBs for which an X2 interface is configured due to mobility reasons.

When the time-domain inter-cell interference coordination is used to mitigate interference, the eNB signals its almost blank subframe (ABS) patterns to its neighboring eNBs, so that the receiving eNB can utilize the ABS of the sending eNB with less interference.

A typical use case of the time-domain solution of inter-cell interference coordination is the one where an eNB providing broader coverage and therefore being more capacity constrained determines its ABS patterns and indicates them to eNBs, providing smaller coverage residing in its area.

The Load Indication procedure is used to transfer interference co-ordination information between neighboring eNBs managing intra-frequency cells.

CoMP Procedures

The present invention proposes a signaling procedure and pieces of information and parameters exchanged between eNBs for centralized/distributed CoMP architectures.

A centralized CoMP architecture is described below.

FIG. 8 illustrates a centralized signaling procedure for an inter-eNB CoMP in accordance with an embodiment of the present invention.

The centralized CoMP architecture is applied when more than two eNBs are grouped together. In FIG. 8, it is assumed that an eNB 1, an eNB 2 to an eNB n form a cluster for CoMP coordination, the eNB 1, the eNB 2 to an eNB n−1 are SeNBs, and the eNB n is an MeNB. It is also assumed that the eNB n, that is, an MeNB, is a node that determines a CoMP operation.

A signaling procedure for the centralized CoMP architecture in accordance with an embodiment of the present invention is not limited thereto, but likewise may be applied to a case where all the eNB 1 to the eNB n forming a CoMP cluster are MeNBs or SeNBs. Furthermore, a node that determines a CoMP operation may be a separate node other than eNBs that form a CoMP cluster.

Referring to FIG. 8, UE sends a measurement report to the eNB 1 (SeNB) to which the UE belongs (S801).

As described above, the UE may measure channel state/statistical information about a cell included in a CoMP measurement set and may report the measurement results to the serving eNB (i.e., the eNB 1).

The eNB 1 requests the start of a CoMP operation by sending a LOAD INFORMATION message to the eNB n (S803).

As described above, the LOAD INFORMATION message may be used for an eNB to deliver load and interference coordination information about a neighboring eNB. The LOAD INFORMATION message may also be used in a centralized signaling procedure for the inter-eNB CoMP operation in accordance with an embodiment of the present invention.

In this case, the eNB 1 may include Invoke Indication information element (IE) in the LOAD INFORMATION message in order to request the eNB n to initiate the CoMP operation and may send the LOAD INFORMATION message including the Invoke Indication IE.

Furthermore, the LOAD INFORMATION message may be transmitted periodically, aperiodically, or based on an event.

The eNB 1 may determine whether or not to request the CoMP operation based on the measurement report message received from the UE. That is, the eNB 1 may determine whether or not to request the CoMP operation based on the CSI measurement of points included in a CoMP measurement set. If an eNB feels severe DL interferences from neighbour cells, it may invoke eNB n to start the CoMP operation.

For example, if the eNB 1 sends the LOAD INFORMATION message to the eNB n periodically or aperiodically, the eNB 1 may include the Invoke Indication IE in the LOAD INFORMATION message only when the request is made to initiate the CoMP procedure and may send the LOAD INFORMATION message, including the Invoke Indication IE, to the eNB n. In contrast, if the eNB 1 sends the LOAD INFORMATION message to the eNB n based on an event, the eNB 1 may send the LOAD INFORMATION message (including the Invoke Indication IE) to the eNB n only when the eNB 1 determines to request the CoMP operation.

Information included in the LOAD INFORMATION message is described in detail later.

Also, when requesting the CoMP operation, the eNB can include the measured information (e.g. CSI, RSRP, SRS received power, User perceived throughput, etc.) and/or the Benefit metric of individual UE in the message. That is, the eNB 1 may include CoMP Material (i.e., Benefit Metric and/or measured information) that may be used for resource coordination in the LOAD INFORMATION message and send the LOAD INFORMATION message while requesting the CoMP operation.

The Benefit Metric quantifies a benefit expected by a cell of a sender node in its scheduling when an associated CoMP Hypothesis(es) are assumed. The Benefit Metric may be periodically or aperiodically transmitted through the LOAD INFORMATION message. Furthermore, the Benefit Metric may be indicative of benefit information based on each physical resource block (PRB). Furthermore, the RSRP is responsible for providing notification of how much is UE in each cell influenced by a neighboring cell or eNB.

When the request for the start of the CoMP procedure is received from any one eNB (e.g., the eNB 1) of the eNBs (i.e., the eNB 1 to the eNB n−1) included in the CoMP cluster, the eNB n requests the eNB, included in the CoMP cluster, to send the Benefit Metric and/or the measured information thereto by sending a LOAD INFORMATION message to the eNB included in the CoMP cluster (S805).

After receiving the CoMP Operation Request, eNB n requests eNBs belonging to the CoMP cooperation cluster to send the measured information (e.g. CSI, RSRP, SRS received power, User perceived throughput, etc.) and/or the Benefit metrics for resource coordination. That is, the eNB n includes Invoke Indication IE for requesting the eNB 1 to the eNB n−1 to send the Benefit Metric and/or the measured information thereto in the LOAD INFORMATION message and sends the LOAD INFORMATION message including the Invoke Indication IE. Information included in the LOAD INFORMATION message is described in detail later.

In this case, if the eNB 1 requests the CoMP operation and at the same time includes the Benefit Metric and/or the measured information in the LOAD INFORMATION message and sends the LOAD INFORMATION message at step S803, the eNB n may request the eNB 1 to not send the Benefit Metric and/or the measured information thereto. In other words, the eNB n may send the LOAD INFORMATION message for requesting the Benefit Metric and/or the measured information from only other eNBs (i.e., the eNB 2 to the eNB n−1) other than the eNB 1.

The LOAD INFORMATION message can include information describing a transmission condition for the measured information and/or Benefit metric and information about a transmission period of the measured information and/or Benefit metric.

More specifically, if information about a transmission condition for the measured information and/or the Benefit metric are transmitted being included in the LOAD INFORMATION message, eNBs (or SeNBs) within a CoMP cluster can transmit the measured information and/or Benefit metric to the eNB n through the LOAD INFORMATION message each time the corresponding transmission condition is met. For example, the transmission condition may include a case where interference from a neighboring cell exceeds a predetermined threshold, a case where the interference is reduced below a predetermined threshold, or a case where throughput of the corresponding UE exceeds or is reduced below a predetermined threshold.

Also, if information about a transmission period of the measured information and/or Benefit metric is transmitted being included in the LOAD INFORMATION message, the eNBs (or SeNBs) within a CoMP cluster can transmit the measured information and/or Benefit metric to the eNB n through the LOAD INFORMATION message at the corresponding intervals.

When the Benefit Metric and/or the measured information are requested by the eNB n, each of the eNB 1 to the eNB n-1 sends the Benefit Metric and/or the measured information to the eNB n through a LOAD INFORMATION message (S807).

Information included in the LOAD INFORMATION message is described in detail later.

When the Benefit Metric and/or the measured information are received from the eNBs, the eNB n coordinates the resources of a cell included in each of the eNBs (i.e., the eNB 1 to the eNB n-1) included in the CoMP cluster (S809).

The eNB n coordinates the resources of cells included in the respective eNBs based on the Benefit Metric and/or the measured information received from the eNBs included in the CoMP cluster. When performing the CoMP operation for corresponding UE in an eNB included in the CoMP cluster, the eNB n may determine that what time-frequency resources or what beam pattern will be used for each cell. More specifically, eNB n may coordinate resources to be allocated in every cell that belongs to the CoMP cluster in frequency/time/power/spatial domain. Also, eNB n may determine PRB muting scheduling, relative narrowband transmit power (RNTP) scheduling, almost blank subframes (ABS) pattern scheduling (in power and spatial domain) and PRB power strength scheduling that will be executed in every cell that belongs to the CoMP cluster. Also, the eNB n may determine coordination for reference signal configurations, CSI processes and CSI-Interference Measurement (IM) configurations that will be executed in every cell that belongs to the CoMP cluster.

Furthermore, the eNB n may determine a CoMP transmission point that is formed of one or more of the eNBs included in the CoMP cluster and that is used to send data to corresponding UE and may coordinate the resources of the determined CoMP transmission point. In other words, the eNB n may determine that what time-frequency resources or what beam pattern will be used for each determined CoMP transmission point.

The eNB n which has coordinated the resources of each cell on which the CoMP operation will be performed sends CoMP Hypotheses to each of the eNBs, included in the CoMP cluster, through a LOAD INFORMATION message (S811).

The CoMP Hypotheses are indicative of the results of resource coordination for an eNB that will perform the CoMP operation. The resource coordination may denote how resources used in cells that will perform the CoMP operation will be allocated to the respective cells while the resources are not overlapped with each other.

The CoMP Hypotheses may include the information of frequency/time/power/spatial domain resource allocations that will be executed in every cell belong to CoMP cluster. The CoMP Hypotheses may include the PRB muting scheduling result, RNTP scheduling result, ABS pattern scheduling result, and PRB power strength scheduling result that will be executed in every cell that belongs to the CoMP cluster. Also, the CoMP Hypotheses may include coordination for reference signal configurations, CSI processes and CSI-Interference Measurement (IM) configurations that will be executed in every cell that belongs to the CoMP cluster.

The CoMP Hypotheses may be transmitted through the LOAD INFORMATION message periodically or aperiodically. If the CoMP Hypotheses is periodically transmitted, the CoMP Hypotheses may include the transmission period of the CoMP Hypotheses. If the CoMP Hypotheses is aperiodically transmitted, the CoMP Hypotheses may include the valid time of the CoMP Hypotheses. The CoMP Hypotheses may indicate information about the resource coordination of each of PRBs within one or more subframes in each cell.

The CoMP Hypotheses may comprise Hypothetical resource allocation associated with a cell ID, and a cell identified by the cell ID is not necessarily controlled by a reception eNB.

The CoMP Hypotheses which is transmitted to a certain eNB may include the results of resource coordination for all the eNBs (including the certain eNB) that perform the CoMP operation. That is, the CoMP Hypotheses may include the results of resource coordination for another eNBs as well as the certain eNB that will perform a CoMP operation through cooperation in addition to information about time-frequency resources or a beam pattern. Information included in the LOAD INFORMATION message is described in detail later.

Although not illustrated, while performing the CoMP operation, the eNB n may stop the CoMP operation by sending a LOAD INFORMATION message for requesting the CoMP operation to be stopped to an eNB included in the CoMP cluster. In this case, the eNB n may send the LOAD INFORMATION message after determining whether to stop the CoMP operation by receiving the usage ratio status of the resources allocated for the CoMP operation of the eNBs belonging to the CoMP cluster. For example, if the usage ratio status of the resources designated for the CoMP operation in the eNBs belonging to the cluster is reduced below a predetermined threshold, the eNB n can transmit the LOAD INFORMATION message for requesting suspension of the CoMP operation. Furthermore, the eNB n may send a corresponding LOAD INFORMATION message to the remaining eNBs included in the CoMP cluster when a LOAD INFORMATION message for requesting the stop of a CoMP operation is received due to the usage ratio status of resources from any one of the eNBs (i.e., the eNB 1 to the eNB n-1) included in the CoMP cluster.

Information included in the LOAD INFORMATION message used in a signaling procedure for the centralized CoMP architecture of FIG. 8 is described in detail below.

Table 1 illustrates the LOAD INFORMATION message in accordance with an embodiment of the present invention.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 ... <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 ... <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>CoMP Information | O | | 9.2.x | | YES | ignore |
| >>Invoke Indication | O | | 9.2.55 | | YES | ignore |
| >>Time Period for CoMP Material | M | | ENUMERATED (5, 10, 20, 40, 80, ...) | | | |
| >>CHOICE Time Period for CoMP Hypotheses | M | | | | | |
| >>>Periodic | | | | | | |
| >>>>Time Period | M | | ENUMERATED (5, 10, 20, 40, 80, ...) | | | |
| >>>Aperiodic | | | | | | |
| >>>>Time Limit | | | INTEGER (0 ... 1024) | Unit is ms, and until the indicated value the CoMP Hypotheses is valid. If the value is '0', the CoMP Hypotheses is valid until | | |

TABLE 1-continued

| IE/Group Name | Presence | Range | IE type and reference | Semantics description | Criticality | Assigned Criticality |
|---|---|---|---|---|---|---|
| | | | | next CoMP Hypotheses is provided. | | |

Referring to Table 1, IE/Group Name represents a name of an information element (IE) or an IE group. "M" of the Presence field denotes an IE/IE group included in a message all the time as a mandatory IE, "O" denotes an IE/IE group that may be included in a message or may not included, as an optional IE, and "C" denotes an IE/IE group included in a message only when particular conditions are met, as a conditional IE. The Range field represents the number by which IEs/IE groups are repeated.

The IE type and reference field represents a type (for example, ENUMERATED, INTEGER, OCTET STRING, etc) of a corresponding IE, and when a range of values of the corresponding IE exists, the IE type and reference field represents the range of the values.

The Criticality field represents criticality information applied to an IE/IE group. The criticality information refers to information indicating how a receiving end is to operate when the receiving end cannot understand the entirety of a portion of an IE/IE group. "–" denotes that criticality information is not applied, and "YES" denotes that criticality information is applied. "GLOBAL" represents that an IE and corresponding IEs commonly have single criticality information. "EACH" represents that each of repeated IEs has unique criticality information. Assigned Criticality field represents actual criticality information.

An IE or IE group included in the LOAD INFORMATION message will be described in detail.

The Message Type IE uniquely identifies the message being sent.

The Cell Information IE includes the Cell Information Item IE of each cell included in an eNB that sends a LOAD INFORMATION message.

The Cell Information Item IE is repeated by a maximum number of cells that belong to a corresponding eNB. The Cell Information Item IE may include a Cell ID, UL Interference Overload Indication, UL High Interference Information, Relative Narrowband Tx Power (RNTP), ABS Information, CoMP Information, and Invoke Indication IEs. Furthermore, the Cell Information Item IE may further include a Time Period for a CoMP Material IE and a CHOICE Time Period for a CoMP Hypotheses IE. This is described in detail later.

The cell ID IE is indicative of the ID of a source cell. That is, the cell ID IE is indicative of the ID of a cell, that is, the subject of a corresponding Cell Information Item IE. A UTRAN Cell Global Identifier (ECGI), that is, a unique identifier for globally identifying a cell may be used.

The UL Interference Overload Indication IE provides, per PRB, a report on interference overload. The interaction between the indication of UL Interference Overload and UL High Interference is specific to an implementation.

The UL High Interference information IE is repeated by a maximum number of cells that belong to a corresponding eNB. The UL High Interference information IE includes a Target Cell ID IE and UL High Interference Indication.

The Target Cell ID IE is indicative of the ID of a cell, that is, the subject of High Interference Information (HII). An ECGI may be used as the Target Cell ID.

The UL High Interference Indication IE provides, per PRB, a 2 level report on interference sensitivity. The interaction between the indication of UL Overload and UL High Interference is specific to an implementation.

The Relative Narrowband Tx Power (RNTP) IE provides indication of a DL power restriction per PRB in a cell and other information required by a neighboring eNB for interference-aware scheduling.

The ABS information IE provides information about which subframes a transmission eNB is configuring as almost blank subframes and which subset of almost blank subframes are recommended for configuring measurements towards UE. Almost blank subframes are subframes with reduced power on some physical channels and/or reduced activity.

The Invoke Indication IE provides indication of which type of information a transmission eNB would like the reception eNB to send back. The Invoke Indication IE is described in detail later.

The CoMP Information IE provides information about a CoMP operation, and may contain CoMP Material to be used for resource coordination or CoMP Result indicative of resource coordination results or CoMP Inactive indicative that interference coordination by means of CoMP is not active. The CoMP Information IE is described in detail later.

The Time Period for CoMP Material IE denotes a time period in which the eNBs (i.e., the eNB 1 to the eNB n–1) forming the CoMP cluster send CoMP Material. Any one value of predetermined 5, 10, 20, 40, and 80 is selected as the value of the Time Period for CoMP Material IE. The value of the Time Period for CoMP Material may be determined to be a different value for each cell (or each eNB).

The CHOICE Time Period for CoMP Hypotheses IE denotes whether the eNB n will send the CoMP Hypotheses to the eNBs (i.e., the eNB 1 to the eNB n–1) forming the CoMP cluster periodically or aperiodically. If the CoMP Hypotheses are periodically transmitted in the CHOICE Time Period for CoMP Hypotheses IE, a Periodic IE is included in the CHOICE Time Period for CoMP Hypotheses IE. If the CoMP Hypotheses are aperiodically transmitted, an Aperiodic IE is included in the CHOICE Time Period for CoMP Hypotheses IE.

The Periodic IE includes a Time Period IE indicative of the transmission period of the CoMP Hypotheses. Furthermore, the Aperiodic IE includes a Time Limit IE indicative of the valid time of the CoMP Hypotheses. The value of the Time Period IE may be different for each cell (or each eNB). Furthermore, the value of the Time Period IE may be different from or the same as that of the Time Period for CoMP Material IE.

If the Periodic IE is included in the CHOICE Time Period for CoMP Hypotheses IE, the CoMP Hypotheses are valid only in a time period indicated in a corresponding Time Period IE. Any one value of predetermined 5, 10, 20, 40, and 80 is selected as the value of the Time Period IE.

In contrast, if the Aperiodic IE is included in the CHOICE Time Period for CoMP Hypotheses IE, the CoMP Hypotheses are determined to be valid based on a valid indicated in the Time Limit IE. The unit of the value of the Time Limit IE is ms because it has an integer value of 0 to 1024. If the Time Limit IE has a value more than 0, the CoMP Hypotheses is valid from a point of time at which corresponding CoMP Hypotheses were transmitted (or a point of time at which corresponding CoMP Hypotheses were received) to a time value indicated in the Time Limit IE. If the value of the Time Limit IE is '0', the CoMP Hypotheses until next CoMP Hypotheses are provided from a point of time at which corresponding CoMP Hypotheses were transmitted (or a point of time at which corresponding CoMP Hypotheses were received).

The Invoke Indication IE illustrated in Table 1 is described below.

Table 2 illustrates the Invoke Indication IE in accordance with an embodiment of the present invention.

TABLE 2

| IE/Group Name | Presence | Range | IE type and reference | Semantics description |
|---|---|---|---|---|
| Invoke Indication | M | | ENUMERATED (ABS Information, CoMP Initiation, CoMP Information . . .) | ABS Information: To request the ABS operation CoMP Initiation: To initiate the CoMP procedure CoMP Information: To request the CoMP Material |

The fields enumerated in Table 2 are identical to the fields of Table 1, and thus, descriptions thereof will now be omitted.

Referring to Table 2, the Invoke Indication IE denotes any one piece of information selected from ABS Information, CoMP Initiation, CoMP Information, and so on.

The ABS Information denotes information for requesting an ABS operation, the CoMP Initiation denotes information for initiating a CoMP procedure, and the CoMP Information denotes information for requesting CoMP Material.

The CoMP Information IE illustrated in Table 1 is described below.

Table 3 illustrates the CoMP Information IE in accordance with an embodiment of the present invention.

TABLE 3

| IE/Group Name | Presence | Range | IE type and reference | Semantics description |
|---|---|---|---|---|
| CHOICE CoMP Information | M | | — | — |
| >CoMP Material | | | — | — |
| >>Benefit Metric | M | | 9.2.x | |
| >>RSRP Measurement | O | | 9.2.y | |
| >CoMP Result | | | — | — |
| >>CoMP Hypotheses | M | | 9.2.z | |
| >>CoMP Starting Point | M | | | SFN sync information |
| >>Time Period for CoMP Material | M | | ENUMERATED (5, 10, 20, 40, 80, . . .) | |
| >>CHOICE Time Period for CoMP Hypotheses | M | | | |
| >>>Periodic | | | | |
| >>>>Time Period | M | | ENUMERATED (5, 10, 20, 40, 80, . . .) | |
| >>>Aperiodic | | | | |
| >>>>Time Limit | | | INTEGER (0 . . . 1024) | Unit is ms, and until the indicated value the CoMP Hypotheses is valid. If the value is '0', the CoMP Hypotheses is valid until next CoMP Hypotheses is provided. |

TABLE 3-continued

| IE/Group Name | Presence | Range | IE type and reference | Semantics description |
|---|---|---|---|---|
| >CoMP Inactive | M | | NULL | Indicates that interference coordination by means of CoMP is not active |

The fields enumerated in Table 3 are identical to the fields of Table 1, and thus, descriptions thereof will now be omitted.

Referring to Table 3, as described above, the CoMP Information IE denotes any one IE selected from CoMP Material, CoMP Result, and CoMP Inactive.

The CoMP Material IE includes a Benefit Metric IE and may further include an RSRP Measurement IE. The Benefit Metric IE and the RSRP Measurement IE provide information to be used for resource coordination for a CoMP operation.

The Benefit Metric IE denotes information indicative that it will be of benefit to a corresponding cell only how a neighboring cell mutes resources with respect to each cell belonging to an eNB that sends the Benefit Metric IE. That is, the Benefit Metric quantifies a benefit expected by a cell of a sender node in its scheduling when associated CoMP Hypothesis(es) is assumed. The Benefit Metric IE is described in detail later.

The RSRP Measurement IE denote UE that has performed RSRP Measurement and RSRP Measurement information about each cell that has been measured in the corresponding UE. As described above, the RSRP Measurement IE is an optional IE and may not be included in the CoMP Information IE. That is, the RSRP Measurement IE may be transmitted through another message in addition to a LOAD INFORMATION message. The RSRP Measurement IE is described in detail later.

The CoMP Result IE denotes the results of coordinated results of each of cells that belong to a CoMP cluster, and may include CoMP Hypotheses, CoMP Starting Point, Time Period for CoMP Material, and CHOICE Time Period for CoMP Hypotheses IEs.

The CoMP Hypotheses IE provides CoMP Hypotheses indicative of the results of resource coordination for a CoMP operation. The CoMP Hypotheses IE is described in detail later.

The CoMP Starting Point IE is information used for cells, belonging to a CoMP cluster, to synchronize their CoMP operations, and it denotes a subframe indicative of the start point of a CoMP operation.

The Time Period for CoMP Material IE denotes a time period in which the eNB (i.e., the eNB 1 to the eNB n-1) forming the CoMP cluster sends CoMP Material. Any one value of predetermined 5, 10, 20, 40, and 80 is selected as the Time Period for CoMP Material IE.

The CHOICE Time Period for CoMP Hypotheses IE denotes whether the eNB n will send CoMP Hypotheses to the eNBs (i.e., the eNB 1 to the eNB n-1), forming the CoMP cluster, periodically or aperiodically. If the CoMP Hypotheses are periodically transmitted, a Periodic IE is included in the CHOICE Time Period for CoMP Hypotheses IE. If the CoMP Hypotheses are aperiodically transmitted, an Aperiodic IE is included in the CHOICE Time Period for CoMP Hypotheses IE.

The Periodic IE includes a Time Period IE indicative of the transmission period of the CoMP Hypotheses. Furthermore, the Aperiodic IE includes a Time Limit IE indicative of the valid time of the CoMP Hypotheses.

If the Periodic IE is included in the CHOICE Time Period for CoMP Hypotheses IE, the CoMP Hypotheses are valid only in a time period indicated in a corresponding Time Period IE. Any one value of predetermined 5, 10, 20, 40, and 80 is selected as the value of the Time Period IE.

In contrast, if the Aperiodic IE is included in the CHOICE Time Period for CoMP Hypotheses IE, the CoMP Hypotheses are determined to be valid based on a value indicated in the Time Limit IE. The value of the Time Limit IE is an integer value of 0 to 1024, and the unit of the value of the Time Limit IE is ms. If the Time Limit IE has a value more than 0, CoMP Hypotheses are valid from a point of time at which the corresponding CoMP Hypotheses were transmitted (or a point of time at which the corresponding CoMP Hypotheses were received) to a time value indicated in the Time Limit IE. If the value of the Time Limit IE is '0', the CoMP Hypotheses are valid until next CoMP Hypotheses are provided from a point of time at which the corresponding CoMP Hypotheses were transmitted (or a point of time at which the corresponding CoMP Hypotheses were received).

The CoMP Inactive IE indicates that interference coordination by means of CoMP is not active.

The Benefit Metric IE illustrated in Table 3 is described below.

Table 4 illustrates the Benefit Metric IE in accordance with an embodiment of the present invention.

TABLE 4

| IE/Group Name | Presence | Range | IE type and reference | Semantics description |
|---|---|---|---|---|
| Benefit Metric | M | 1 . . . <maxCoMPCandidates> | — | — |
| >Muting Info | M | 1 . . . <maxCellsforCoMPCluster> | — | — |
| >>Global Cell ID | M | | ECGI 9.2.14 | |

TABLE 4-continued

| IE/Group Name | Presence | Range | IE type and reference | Semantics description |
|---|---|---|---|---|
| >>Muting | M | | ENUMERATED (0, 1, . . .) | '0' means the corresponding cell mutes, and '1' means the corresponding cell does not mute. |
| >Benefit Info | M | | — | — |
| >>Subframe | M | 1 . . . <maxSubframesforCoMP> | — | — |
| >>>RB | M | 1 . . . <maxRBs> | — | — |
| >>>>Benefit | M | | BIT STRING (SIZE(10)) | Denote the amount of benefit for each RB when the CoMP candidate is applied. |

The fields enumerated in Table 4 are identical to the fields of Table 1, and thus, descriptions thereof will now be omitted.

Referring to Table 4, the Benefit Metric IE denotes resource muting information in one or more candidates capable of a CoMP operation and a gain in one or more cells belonging to an eNB that sends a Benefit Metric IE due to the resource muting information. The Benefit Metric IE is repeated by a maximum number of one or more candidates capable of a CoMP operation. The Benefit Metric IE includes a Muting Info IE and a Benefit Info IE.

The Muting Info IE is indicative of muting information in one or more cells included in the CoMP cluster. The Muting Info IE is repeated by a maximum number of cells included in the CoMP cluster. The Muting Info IE includes a Global Cell ID IE and a Muting IE.

The Global Cell ID IE is indicative of the ID of a cell, that is, the subject of a Muting IE. An ECGI may be used as the Global Cell ID.

The Muting IE denotes muting information for a corresponding cell. '0' means that a corresponding cell is muted, and '1' means that a corresponding cell is not muted.

The Benefit Info IE denotes a gain in a cell belonging to an eNB that sends a Benefit Metric IE if resource muting is performed in one or more cells belonging to a CoMP cluster. The Benefit Info IE includes the Subframe IE of each subframe.

The Subframe IE denotes one or more subframes for a CoMP operation. The Subframe IE is repeated by a maximum number of subframes for a CoMP operation. The Subframe IE includes an RB IE.

The RB IE denotes one or more RBs for a CoMP operation. The RB IE is repeated by a maximum number of RBs in a corresponding subframe. Each RB IE includes a Benefit IE.

The Benefit IE denotes the amount of benefit of each RB when a CoMP candidate is applied.

The RSRP Measurement IE illustrated in Table 3 is described below.

Table 5 illustrates the RSRP Measurement IE in accordance with an embodiment of the present invention.

TABLE 5

| IE/Group Name | Presence | Range | IE type and reference | Semantics description |
|---|---|---|---|---|
| UEs | M | 1 . . . maxUENumber> | | |
| >C-RNTI | M | | BIT STRING (SIZE (16)) | C-RNTI contained in the RRC Re-establishment Request message (TS 36.331 [9]) |
| >RSRP Measurement | M | 1 . . . maxCellsforCoMPCluster> | | |
| >>Global Cell ID | M | | ECGI 9.2.14 | |
| >>RSRP Result | M | | INTEGER (0 . . . 97) | This IE is defined in TS 36.331 [9]. |

The fields enumerated in Table 5 are identical to the fields of Table 1, and thus, descriptions thereof will now be omitted.

Referring to Table 5, the RSRP Measurement IE includes a UE IE indicative of pieces of UE that perform RSRP Measurement. The UE IE includes a C-RITI IE and an RSRP Measurement IE. The UE IE is repeated by a maximum number of pieces of UEs.

The C-RITI IE denotes the cell ID of corresponding UE. The C-RITI is allocated by an eNB belonging to corresponding UE, included in an RRC re-establishment request message, and transmitted to the UE.

The RSRP Measurement IE denotes the RSRP Measurement results of corresponding UE for each cell included in a CoMP cluster. The RSRP Measurement IE is repeated by a maximum number of cells included in the CoMP cluster. The RSRP Measurement IE includes a Global Cell ID IE and an RSRP Result IE.

The Global Cell ID IE denotes a cell ID that is the subject of RSRP Measurement. An ECGI may be used as the Global Cell ID.

The RSRP Result IE denotes an RSRP Measurement value measured by UE, and it is represented using an integer value. Reference Signal Received Power (RSRP) denotes a linear average of power distributions of resource elements in which a Cell-specific Reference Signal (CRS) is transmitted within a measurement frequency band.

The CoMP Hypotheses IE illustrated in Table 3 is described below.

Table 6 illustrates the CoMP Hypotheses IE in accordance with an embodiment of the present invention.

1) LOAD INFORMATION (Invoke Indication, the Benefit Metric, the RSRP Measurement) at Step S803

The LOAD INFORMATION message at step S803 may include IEs of the IEs illustrated in Table 1 other than the Time Period for CoMP Material IE and the CHOICE Time Period for CoMP Hypotheses IE.

In particular, the LOAD INFORMATION message at step S803 includes the Invoke Indication IE of Table 1. Furthermore, referring to Table 2, CoMP Initiation may be selected as the value of the Invoke Indication IE because the LOAD INFORMATION message at step S803 is a message for requesting the start of the CoMP operation.

Furthermore, as described above, the eNB 1 may include the CoMP material (i.e., the Benefit Metric and/or the RSRP Measurement results) that may be used for resource coordination in the LOAD INFORMATION message and send the LOAD INFORMATION message while requesting the CoMP operation. If the CoMP material, together with the CoMP operation request, is transmitted through the LOAD INFORMATION message as described above, the CoMP Information IE of Table 1 is included in the LOAD INFORMATION message. In contrast, if only the CoMP operation request is transmitted through the LOAD INFORMATION message, the CoMP Information IE of Table may not be included in the LOAD INFORMATION message.

TABLE 6

| IE/Group Name | Presence | Range | IE type and reference | Semantics description |
|---|---|---|---|---|
| CoMP Hypotheses | M | 1 . . . <maxCellsforCoMPCluster> | — | — |
| >Cell ID | M | | — | — |
| >Subframe | | 1 . . . <maxSubframesforCoMP> | — | — |
| >>RB | M | 1 . . . <maxRBs> | — | — |
| >>>Muting | M | | ENUMERATED (0, 1, . . .) | |

The fields enumerated in Table 6 are identical to the fields of Table 1, and thus, descriptions thereof will now be omitted.

Referring to Table 6, the CoMP Hypotheses IE denotes resource muting information about one or more cells included in the CoMP cluster. The CoMP Hypotheses IE is repeated by a maximum number of cells included in the CoMP cluster. The CoMP Hypotheses IE includes a Cell ID IE and a Subframe IE.

The cell ID IE denotes the ID of a cell that is the subject of corresponding CoMP Hypotheses. An ECGI may be used as the Cell ID.

The Subframe IE denotes one or more subframe for a CoMP operation. The Subframe IE is repeated by a maximum number of subframes for the CoMP operation. The Subframe IE includes an RB IE.

The RB IE denotes one or more RBs for the CoMP operation. The RB IE is repeated by a maximum number of RBs in a corresponding subframe. Each RB IE includes a Muting IE.

The Muting IE denotes muting information about a corresponding RB. '0' means that a corresponding RB is muted, and '1' means that a corresponding RB is not muted.

Information included in the LOAD INFORMATION message used in each step is described below with reference to FIG. 8 again.

A case where the eNB 1 sends the LOAD INFORMATION message, including the CoMP material, along with the CoMP operation request is assumed and described below.

In this case, the CoMP Material IE of Table 3 may be selected as CoMP Information because the LOAD INFORMATION message at step S803 is a message for requesting the start of the CoMP operation. If the CoMP Material IE is selected as the CoMP Information as described above, the CoMP Material IE (i.e., the Benefit Metric IE (Table 4) and the RSRP Measurement IE (Table 5)) are transmitted through the LOAD INFORMATION message.

2) LOAD INFORMATION (Invoke Indication) at Step S805

The LOAD INFORMATION message at step S805 may include all the IEs illustrated in Table 1. That is, the LOAD INFORMATION message may also include the Time Period for CoMP Material IE and the CHOICE Time Period for CoMP Hypotheses IE.

The LOAD INFORMATION message at step S805 includes an Invoke Indication IE like the LOAD INFORMATION message at step S803, but the Invoke Indication IE of the LOAD INFORMATION message at step S805 may have a value different from that of the LOAD INFORMATION message at step S803. That is, referring to Table 2, CoMP Information may be selected as the value of the Invoke Indication IE because the LOAD INFORMATION message at step S805 is a message for requesting CoMP Material.

The CoMP Information IE may not be included in Table 1 because the LOAD INFORMATION message at step S805 is a message for requesting CoMP Material.

However, the CoMP Information IE may be exceptionally included in Table 1. This is described in detail with reference to Table 3. Since the LOAD INFORMATION message at step S805 is a message for requesting CoMP Material, the CoMP Inactive IE may be selected as the value of the CoMP Information IE. That is, if the start of the CoMP operation is impossible (e.g., if the eNB n determines that available resources are not present in other eNBs within the CoMP cluster based on previously received CoMP Material), the CoMP Inactive IE may be selected as CoMP Information and the CoMP Information IE may be transmitted through the LOAD INFORMATION message.

3) LOAD INFORMATION (Benefit Metric, the RSRP Measurement) at Step S807

The LOAD INFORMATION message at step S807 may include IEs if the IEs illustrated in Table 1 other than the Time Period for CoMP Material IE and the CHOICE Time Period for CoMP Hypotheses IE. However, the Invoke Indication IE may not be included in Table 1 because the LOAD INFORMATION message at step S807 is a message for sending CoMP Material.

Furthermore, the CoMP Material IE of Table 3 may be selected as CoMP Information because the LOAD INFORMATION message at step S807 is a message for sending CoMP Material. If the CoMP Material IE is selected as the CoMP Information as described above, the CoMP Material IE (i.e., the Benefit Metric IE (Table 4) and the RSRP Measurement IE (Table 5)) are transmitted through the LOAD INFORMATION message.

In this case, if the CoMP Material transmission period is transmitted through the Time Period for CoMP Material IE at step S805, each of the eNBs forming the CoMP cluster sends CoMP Material (i.e., the LOAD INFORMATION message including the CoMP Material) to the eNB n in a time period indicated in the received Time Period for CoMP Material IE.

4) LOAD INFORMATION (the CoMP Hypotheses) at Step S811

The LOAD INFORMATION message at step S811 may include IEs of the IEs illustrated in Table 1 other than the Time Period for CoMP Material IE and the CHOICE Time Period for CoMP Hypotheses IE. However, the Invoke Indication IE may not be included in Table 1 because the LOAD INFORMATION message at step S811 is a request for delivering the results of resource coordination for the CoMP operation.

Furthermore, the CoMP Result IE of Table 3 may be selected as CoMP Information because the LOAD INFORMATION message at step S811 is a message for delivering the results of resource coordination for the CoMP operation. If the CoMP Result IE is selected as the CoMP Information, the CoMP Hypotheses of Table 6 is transmitted through the LOAD INFORMATION message.

In this case, the Time Period for CoMP Material IE and the CHOICE Time Period for CoMP Hypotheses IE may also be transmitted through the LOAD INFORMATION message at step S811. Furthermore, as described above, the Time Period for CoMP Material IE and the CHOICE Time Period for CoMP Hypotheses IE may be transmitted through the LOAD INFORMATION message at step S805. If, as described above, the Time Period for CoMP Material IE and the CHOICE Time Period for CoMP Hypotheses IE are transmitted through the LOAD INFORMATION message at step S805, a corresponding IE may not be transmitted through the LOAD INFORMATION message at step S811.

If the CoMP Material transmission period is transmitted through the Time Period for CoMP Material IE at step S811, each of the eNBs forming the CoMP cluster sends CoMP Material (i.e., the LOAD INFORMATION message including the CoMP Material) to the eNB n in a time period indicated in the received Time Period for CoMP Material IE.

Furthermore, if the CoMP Hypotheses are determined to be periodically transmitted in the CHOICE Time Period for CoMP Hypotheses IE at step S805 or S811, the eNB n delivers the results of resource coordination for the CoMP operation by periodically sending the CoMP Hypotheses.

In contrast, if the CoMP Hypotheses are determined to be aperiodically transmitted in the CHOICE Time Period for CoMP Hypotheses IE at step S805 or S811, the eNB n delivers the results of resource coordination for the CoMP operation by aperiodically (e.g., if the results of the resource coordination are changed or if the UE deviates from the coverage of the CoMP cluster) sending the CoMP Hypotheses.

Meanwhile, if the eNB n determines that the start of the CoMP operation is impossible based on the CoMP Material received from each of the eNBs that form the CoMP cluster (e.g., if the eNB n determines that available resources are not present in other eNBs within the CoMP cluster based on the received CoMP Material), the CoMP Inactive IE of Table 3 may be selected as CoMP Information.

Furthermore, after the eNB n sends the CoMP Hypothesis, any one of the eNBs (i.e., the eNB 1 to the eNB n) forming the CoMP cluster may stop the CoMP operation by sending the LOAD INFORMATION message that includes the CoMP Information IE indicative of CoMP Inactive, while performing the CoMP operation. That is, the eNB n may stop the CoMP operation by sending the LOAD INFORMATION message, including CoMP Inactive, to each of the eNBs forming the CoMP cluster. Furthermore, when the eNB n receives the LOAD INFORMATION message including CoMP Inactive from any one of the eNB 1 to the eNB n−1, the eNB n may stop the CoMP operation by sending the LOAD INFORMATION message, including CoMP Inactive, to the remaining eNBs A distributed CoMP architecture is described below.

FIG. 9 illustrates a distributed signaling procedure for an inter-eNB CoMP in accordance with an embodiment of the present invention.

The distributed CoMP architecture is applied between two neighboring eNBs. In FIG. 9, it is assumed that an eNB 1 and an eNB 2 form a cluster for CoMP coordination (i.e., a CoMP cluster/CoMP cooperating set) and the eNB 2 of the eNB 1 and the eNB 2 is a node that determines a CoMP operation. In this case, the signaling procedure for a distributed CoMP architecture in accordance with an embodiment of the present invention may be identically applied to a case where both the eNB 1 and the eNB 2 are MeNBs or SeNBs or a case where one of the eNB 1 and the eNB 2 is an MeNB and the other of the eNB 1 and the eNB 2 is an SeNB regardless of the cases.

Referring to FIG. 9, UE sends a measurement report to the serving eNB (i.e., eNB 1) to which the UE belongs (S901).

As described above, the UE may measure the channel state/statistical information of a cell included in a CoMP measurement set and may report the results of the measurement to the SeNB (i.e., the eNB 1).

The eNB 1 requests the start of the CoMP operation by sending a LOAD INFORMATION message to the eNB 2, that is, a neighboring eNB at step S903.

As described above, the LOAD INFORMATION message may be used for an eNB to deliver load and interference coordination information about a neighboring eNB, may be used in a centralized CoMP signaling procedure in accordance with an embodiment of the present invention, and may also be used in a distributed signaling procedure for an inter-eNB CoMP operation.

In this case, the eNB 1 may request the eNB 2 from the CoMP operation by including Invoke Indication IE for requesting the eNB 2 to initiate the CoMP procedure in the LOAD INFORMATION message and sending the LOAD INFORMATION message.

In this case, the LOAD INFORMATION message may be transmitted periodically, aperiodically, or based on an event.

The eNB 1 may determine whether or not to request the CoMP operation based on the measurement report message received from the UE. The eNB 1 may determine whether or not to request the CoMP operation based on the CSI measurement of points included in the CoMP measurement set. If an eNB 1 feels severe DL interferences from neighbour cells, it may invoke eNB 2 to start the CoMP operation.

For example, if the eNB 1 sends the LOAD INFORMATION message to the eNB 2 periodically or aperiodically, the eNB 1 may send the LOAD INFORMATION message, including Invoke Indication IE, only when a request to initiate the CoMP procedure is made. In contrast, if the eNB 1 sends the LOAD INFORMATION message to the eNB 2 based on an event, the eNB 1 may send the LOAD INFORMATION message (including Invoke Indication IE) to the eNB 2 only when the eNB 1 determines to request the CoMP operation.

Information included in the LOAD INFORMATION message is described in detail later.

Also, when requesting the CoMP operation, the eNB can include the measured information (e.g. CSI, RSRP, SRS received power, User perceived throughput, etc.) and/or the Benefit metric of individual UE in the message. That is, the eNB 1 may include CoMP Material (i.e., Benefit Metric and/or the measured information) that may be used for resource coordination in the LOAD INFORMATION message and send the LOAD INFORMATION message while requesting the CoMP operation.

If the Benefit Metric and/or the measured information are not included in the LOAD INFORMATION message, the eNB 2 may request the eNB 1 to send the Benefit Metric and/or the measured information to the eNB 2 through the LOAD INFORMATION message. Furthermore, when a request for Benefit Metric and/or the measured information is received from the eNB 2, the eNB 1 may send the Benefit Metric and/or the the measured information to the eNB 2 through the LOAD INFORMATION message. That is, step S805 and step S807 described with reference to FIG. 8 may be performed according to the same scheme after step S903.

When a request for the start of the CoMP procedure is received from the eNB 1 that is a neighboring eNB, the eNB 2 coordinates the resources of the eNB 1 and the eNB 2 (S905).

That is, the eNB 2 coordinates the resources of each cell based on information (e.g., the Benefit Metric and/or the measured information) received from the eNB 1. When the eNB 2 performs the CoMP operation on the eNB 1 and corresponding UE, it may determine that what time-frequency resources or what beam pattern will be used for each cell. More specifically, eNB 2 may coordinate resources to be allocated in every cell that belongs to the eNBs (i.e., eNB 1 and eNB 2) in frequency/time/power/spatial domain. Also, eNB 2 may determine PRB muting scheduling, RNTP scheduling, ABS pattern scheduling (in power and spatial domain) and PRB power strength scheduling that will be executed in every cell that belongs to the eNBs (i.e., eNB 1 and eNB 2). Also, the eNB 2 may determine coordination for reference signal configurations, CSI processes and CSI-Interference Measurement (IM) configurations that will be executed in every cell that belongs to the eNBs (i.e., eNB 1 and eNB 2).

After coordinating the resources of the cells included in the respective eNBs (i.e., the eNB 1 and the eNB 2) that will perform the CoMP operation, the eNB 2 sends CoMP Hypotheses to the eNB 1 through a LOAD INFORMATION message (S907).

The CoMP Hypotheses denote the results of resource coordination for the eNB 1 and the eNB 2 that will perform the CoMP operation. The resource coordination may denote how resources used in cells that will perform the CoMP operation will be allocated to the respective cells while the resources are not overlapped with each other.

The CoMP Hypotheses may include the information of frequency/time/power/spatial domain resource allocations that will be executed in every cell belong to the eNBs (i.e., eNB 1 and eNB 2). The CoMP Hypotheses may include the PRB muting scheduling result, RNTP scheduling result, ABS pattern scheduling result, and PRB power strength scheduling result that will be executed in every cell that belongs to the eNBs (i.e., eNB 1 and eNB 2). Also, the CoMP Hypotheses may include coordination for reference signal configurations, CSI processes and CSI-Interference Measurement (IM) configurations that will be executed in every cell that belongs to the eNBs (i.e., eNB 1 and eNB 2).

The CoMP Hypotheses may comprise Hypothetical resource allocation associated with a cell ID, and a cell identified by the cell ID is not necessarily controlled by a reception eNB.

The CoMP Hypotheses may include the results of resource coordination for all the eNBs that perform the CoMP operation. The CoMP Hypotheses may include the results of resource coordination for another eNB that will perform a CoMP operation through cooperation in addition to information about time-frequency resources or a beam pattern. Information included in the LOAD INFORMATION message is described in detail later.

Although not illustrated, while performing the CoMP operation, the eNB 1 or the eNB 2 may stop the CoMP operation by sending a LOAD INFORMATION message for requesting the CoMP operation to be stopped after determining whether to stop the CoMP operation based on the usage ratio status of resources.

Information included in the LOAD INFORMATION message used in each step is described below.

1) LOAD INFORMATION (Invoke Indication, the Benefit Metric, the RSRP Measurement) at Step S903

The LOAD INFORMATION message at step S903 may include IEs of the IEs illustrated in Table 1 other than the Time Period for CoMP Material IE and the CHOICE Time Period for CoMP Hypotheses IE.

In particular, the LOAD INFORMATION message at step S903 includes the Invoke Indication IE of Table 1. Furthermore, referring to Table 2, CoMP Initiation may be selected as the value of the Invoke Indication IE because the LOAD INFORMATION message at step S903 is a message for requesting the start of the CoMP operation.

Furthermore, as described above, while requesting the CoMP operation, the eNB 1 may include the CoMP material (i.e., the Benefit Metric and/or the RSRP Measurement results) that may be used for resource coordination in the LOAD INFORMATION message and may send the LOAD INFORMATION message including the CoMP material. If the CoMP material, together with the request for the CoMP operation, is transmitted through the LOAD INFORMATION message as described above, the CoMP Information IE of Table 1 is included in the LOAD INFORMATION message. In contrast, if only the request for the CoMP operation is transmitted through the LOAD INFORMATION message, the CoMP Information IE of Table 1 may not be included in the LOAD INFORMATION message.

A case where the eNB 1 sends the LOAD INFORMATION message, including the CoMP material, along with the request for the CoMP operation is assumed and described below.

In this case, the CoMP Material IE of Table 3 may be selected as CoMP Information because the LOAD INFORMATION message at step S903 is a message for requesting the start of the CoMP operation. If the CoMP Material IE is selected as the CoMP Information as described above, the CoMP Material IE (i.e., the Benefit Metric IE of Table 4 and the RSRP Measurement IE of Table 5) is transmitted through the LOAD INFORMATION message.

2) LOAD INFORMATION (the CoMP Hypotheses) at Step S907

The LOAD INFORMATION message at step S907 may include IEs of the IEs illustrated in Table 1 other than the Time Period for CoMP Material IE and the CHOICE Time Period for CoMP Hypotheses IE. In this case, the Invoke Indication IE may not be included in Table 1 because the LOAD INFORMATION message at step S907 is a message for delivering the results of resource coordination for the CoMP operation.

Furthermore, the CoMP Result IE of Table 3 may be selected as CoMP Information because the LOAD INFORMATION message at step S907 is a message for delivering the results of resource coordination for the CoMP operation. If the CoMP Result IE is selected as the CoMP Information, the CoMP Hypotheses of Table 6 are transmitted through the LOAD INFORMATION message.

In this case, the Time Period for CoMP Material IE and the CHOICE Time Period for CoMP Hypotheses IE are also transmitted through the LOAD INFORMATION message at step S907. If a CoMP Material transmission period is transmitted through the Time Period for CoMP Material IE, each eNB (i.e., the eNB 1) that forms the CoMP cluster sends CoMP Material (i.e., the LOAD INFORMATION message including the CoMP Material) to the eNB 2 in a time period indicated in the received Time Period for CoMP Material IE.

Furthermore, if CoMP Hypotheses are determined to be periodically transmitted in the CHOICE Time Period for CoMP Hypotheses IE, the eNB 2 delivers the results of resource coordination for the CoMP operation by periodically sending the CoMP Hypotheses. In contrast, if the CoMP Hypotheses are determined to be aperiodically transmitted in the CHOICE Time Period for CoMP Hypotheses IE, the eNB 2 delivers the results of resource coordination for the CoMP operation by aperiodically (e.g., if the results of the resource coordination results are changed or if the UE deviates from the coverage of the CoMP cluster) sending the CoMP Hypotheses.

Meanwhile, if the start of the CoMP operation is impossible (e.g., if the eNB 2 determines that resources available therefor are not present based on the CoMP Material received from an eNB (i.e., the eNB 1) forming the CoMP cluster), the CoMP Inactive IE of Table 3 may be selected as CoMP Information.

Furthermore, after the eNB 2 sends the CoMP Hypothesis, an eNB (i.e., the eNB 1 or the eNB 2 that forms the CoMP cluster) may stop the CoMP operation by sending the LOAD INFORMATION message, including the CoMP Information IE indicative of CoMP Inactive, while the eNB 1 or the eNB 2 performs the CoMP operation.

Apparatus for Implementing the Present Invention

FIG. 10 is a block diagram of a wireless communication apparatus according to an embodiment of the present invention.

Referring to FIG. 10, a wireless communication system includes an eNB 1010 and a plurality of pieces of UE 1020 that belongs to the eNB 1010. The eNB 1010 includes both the aforementioned MeNB and SeNB.

The eNB 1010 includes a processor 1011, memory 1012, and a Radio Frequency (RF) unit 1013. The processor 1011 may be configured to implement the functions, procedures and/or methods proposed by the present invention and described with reference to FIGS. 1 to 9. The layers of a wireless interface protocol may be implemented by the processor 1011. The memory 1012 is connected to the processor 1011 and is configured to store various types of information for operating the processor 1011. The RF unit 1013 is connected to the processor 1011 and is configured to send and/or receive RF signals.

The UE 1020 includes a processor 1021, memory 1022, and an RF unit 1023. The processor 1021 may be configured to implement the functions, procedures and/or methods proposed by the present invention and described with reference to FIGS. 1 to 9. The layers of a wireless interface protocol may be implemented by the processor 1021. The memory 1022 is connected to the processor 1011 and is configured to store information related to the operations of the processor 1022. The RF unit 1023 is connected to the processor 1011 and is configured to send and/or receive RF signals.

The memory 1012, 1022 may be located inside or outside the processor 1011, 1021 and may be connected to the processor 1011, 1021 through various well-known means. The eNB 1010 and/or the UE 1020 may include a single antenna or multiple antennas.

The aforementioned embodiments may be achieved by combinations of the structural elements and features of the present invention in a predetermined manner. Each of the structural elements or features should be considered to be optional unless specified separately. Each of the structural elements or features may be carried out without being combined with other structural elements or features. Furthermore, some of the structural elements and/or features may be combined with one another to constitute embodiments of the present invention. The order of the operations described in the embodiments of the present invention may be changed. Some of structural elements or features of one embodiment may be included in another embodiment or may be replaced with corresponding structural elements or features of another embodiment. Moreover, it will be apparent that some claims citing specific claims may be combined with one claim that cites the other claim other than the specific claims in order to form the embodiment or to add a new claim through amendments after the application is filed.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

An example in which the schemes for performing a CoMP operation in a wireless communication system in accordance with the embodiments of the present invention are applied to 3GPP LTE/LTE-A systems has been described, but the schemes may be applied to various wireless communication systems in addition to 3GPP LTE/LTE-A systems.

The invention claimed is:

1. A method of performing an inter-eNB Coordinated Multi-Point (CoMP) operation in a wireless communication system, the method comprising:
 receiving, by a first eNB, a first LOAD INFORMATION message from a second eNB requesting that the first eNB start the CoMP operation;
 sending, by the first eNB, a second LOAD INFORMATION message to the second eNB requesting a Benefit Metric Information Element (IE);
 receiving, by the first eNB, a third LOAD INFORMATION message from the second eNB, including the Benefit Metric IE;
 coordinating, by the first eNB, resources for the CoMP operation; and
 sending, by the first eNB, a fourth LOAD INFORMATION message to the second eNB, including results of the resource coordination,
 wherein the first LOAD INFORMATION message includes an Invoke Indication IE, and the Invoke Indication IE includes CoMP Initiation IE for requesting the start of the CoMP operation.

2. The method of claim 1, wherein the first LOAD INFORMATION message further includes the Benefit Metric IE.

3. The method of claim 1, wherein:
 the second LOAD INFORMATION message includes an Invoke Indication IE, and
 the Invoke Indication IE includes CoMP Information IE for requesting the Benefit Metric.

4. The method of claim 1, wherein the second LOAD INFORMATION message further includes information about a transmission period of the Benefit Metric.

5. The method of claim 1, wherein:
 the second LOAD INFORMATION message further includes information about whether the results of the resource coordination are periodically or aperiodically transmitted,
 when the results of the resource coordination are periodically transmitted, the second LOAD INFORMATION message further includes a transmission period of the results of the resource coordination, and
 when the results of the resource coordination are aperiodically transmitted, the second LOAD INFORMATION message further includes information about a time, during which, the results of the resource coordination are valid.

6. The method of claim 1, wherein:
 the third LOAD INFORMATION message includes a CoMP Information IE, and
 the CoMP Information IE includes the Benefit Metric IE.

7. The method of claim 1, wherein:
 the fourth LOAD INFORMATION message includes a CoMP Information IE, and
 the CoMP Information IE includes a CoMP Hypotheses IE indicative of the results of the resource coordination.

8. The method of claim 1, wherein the fourth LOAD INFORMATION message further includes information about a transmission period of the Benefit Metric.

9. The method of claim 1, wherein:
 the fourth LOAD INFORMATION message further includes information about whether the results of the resource coordination are periodically or aperiodically transmitted,
 when the results of the resource coordination are periodically transmitted, the fourth LOAD INFORMATION message further includes a transmission period of the results of the resource coordination, and
 when the results of the resource coordination are aperiodically transmitted, the fourth LOAD INFORMATION message further includes information about a time, during which, the results of the resource coordination are valid.

10. The method of claim 1, further comprising:
 sending, by the first eNB, a fifth LOAD INFORMATION message to the second eNB ordering that the CoMP operation be stopped.

11. A first eNB that performs an inter-eNB Coordinated Multi-Point (CoMP) operation in a wireless communication system, the first eNB comprising:
 a transmitter and a receiver; and
 a processor that:
 controls the receiver to receive a first LOAD INFORMATION message from a second eNB requesting that the first eNB start the CoMP operation;
 controls the transmitter to send a second LOAD INFORMATION message to the second eNB requesting a Benefit Metric Information Element (IE);
 controls the receiver to receive a third LOAD INFORMATION message from the second eNB, including the Benefit Metric IE;
 coordinate resources for a CoMP operation; and
 send a fourth LOAD INFORMATION message to the second eNB, including results of the resource coordination,
 wherein the first LOAD INFORMATION message includes an Invoke Indication IE, and the Invoke Indication IE includes CoMP Initiation IE for requesting the start of the CoMP operation.

* * * * *